United States Patent [19]
Hurley et al.

[11] Patent Number: 5,524,246
[45] Date of Patent: Jun. 4, 1996

[54] METHOD AND APPARATUS FOR CONFIGURING COMPUTER PROGRAMS FROM AVAILABLE SUBPROGRAMS

[75] Inventors: Daniel F. Hurley, Marlboro; Earle H. West, Morganville, both of N.J.

[73] Assignee: AT&T Corp., Murray Hill, N.J.

[21] Appl. No.: 471,106

[22] Filed: Jun. 6, 1995

Related U.S. Application Data

[63] Continuation of Ser. No. 110,235, Aug. 23, 1993, abandoned.
[51] Int. Cl.⁶ ............................................. G06F 9/40
[52] U.S. Cl. ............................ 395/700; 395/100
[58] Field of Search .................................. 395/700, 100

[56] References Cited

U.S. PATENT DOCUMENTS

| | | | |
|---|---|---|---|
| 5,163,130 | 11/1992 | Hullot | 395/148 |
| 5,168,441 | 12/1992 | Onarheim et al. | 364/146 |
| 5,206,951 | 4/1993 | Khoyi et al. | 395/650 |
| 5,287,511 | 2/1994 | Robinson et al. | 395/700 |
| 5,339,393 | 8/1994 | Duffy et al. | 395/161 |

*Primary Examiner*—David K. Moore
*Assistant Examiner*—A. Katbab
*Attorney, Agent, or Firm*—Eugene J. Rosenthal

[57] ABSTRACT

A graphic program configuration system is described that allows a user to create complete computer programs. In particular, the present invention improves on the prior art by providing a system and process that permits a subprogram to have an arbitrary number of outlets that may be defined at program configuration time by stimulating the subprogram to create new outlets that facilitate connecting the subprogram to other subprograms. In particular embodiments of the invention the names for the new outlets may either a) be obtained by virtue of the attempted connection of a subprogram to other subprograms or b) be provided direct entry of the outlet name by a user of the program configuration system, e.g., by typing the outlet names on the keyboard. Additionally, in accordance with an aspect of the invention, outlets can be augmented to have one or more constraining parameters that can be used to ensure that only appropriate relationships are established by connections. Such constraining parameters include: a) number of connections allowed, b) types of connections allowed, c) destination object class, and d) destination object operations required. Thus, a non-programmer or a person with only rudimentary programming skills can configure a collection of one or more subprograms into a complete computer program.

13 Claims, 17 Drawing Sheets

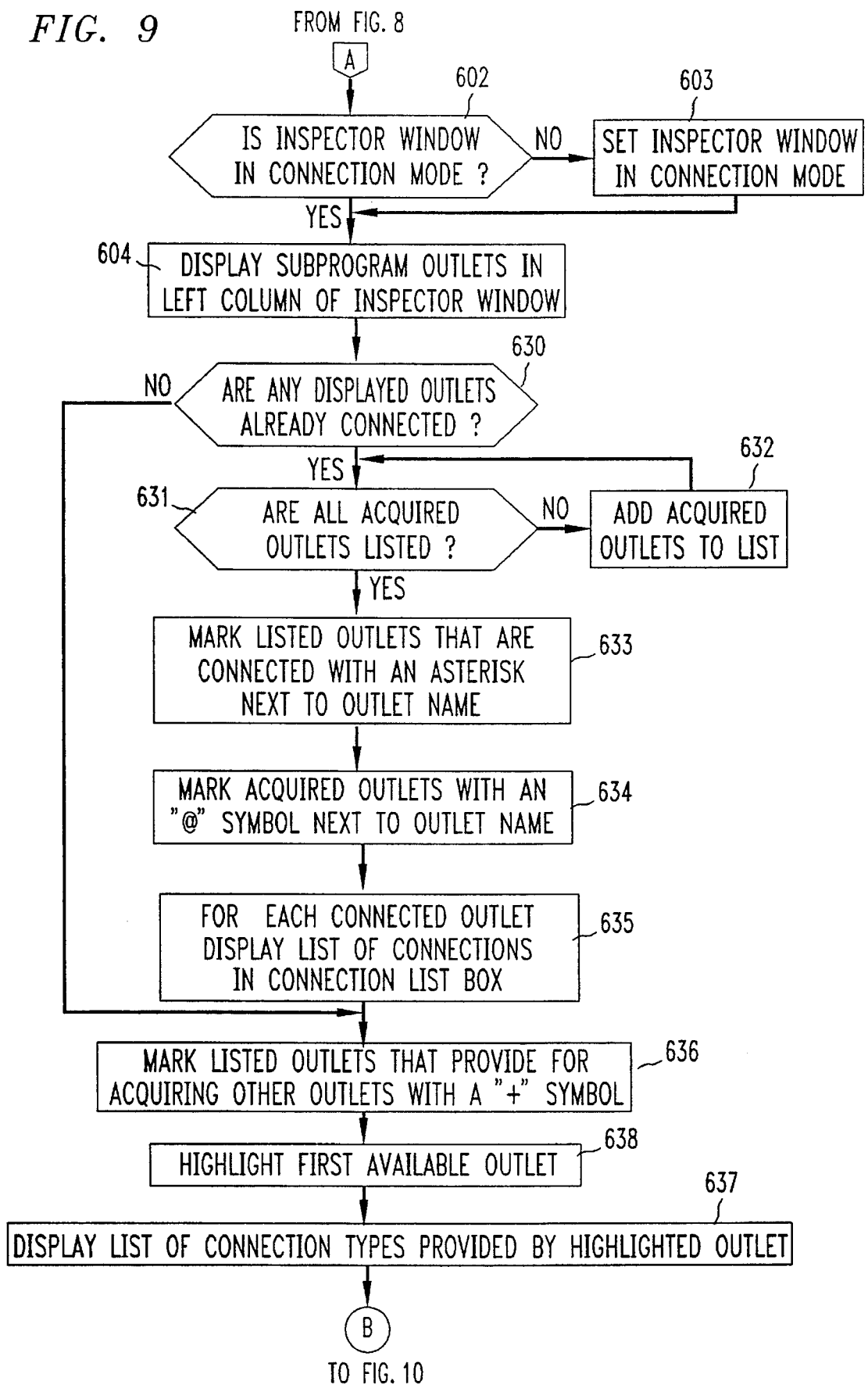

*FIG. 14*

| | 501 | |
|---|---|---|
| 502 | TYPE | <INDEX> |
| 503 | SOURCE | <POINTER> |
| 504 | DESTINATION | <POINTER> |
| 505 | OUTLET | OUTLET VARIABLE NAME |
| 506 | ACTION | FUNCTION NAME |
| 507 | OWNER | OUTLET VARIABLE NAME |

METHOD AND APPARATUS FOR CONFIGURING COMPUTER PROGRAMS FROM AVAILABLE SUBPROGRAMS

This application is a continuation of application Ser. No. 08/110235, filed on Aug. 23, 1993, now abandoned.

TECHNICAL FIELD

This invention relates generally to developing computer programs, such as so-called "object oriented" programs, by connecting and configuring available subprograms.

BACKGROUND OF THE INVENTION

Computer programs allow computers to perform many useful tasks. However, in order to write computer programs, and especially so-called "objected oriented" computer programs, one must have the necessary computer programming skills and knowledge of the syntax of a particular programming language. Developing the necessary programming skills and knowledge requires the investment of a significant amount of time, and usually money. Hence, it is a goal of the art to facilitate the development of computer programs by non-computer programmers or by programmers who only have rudimentary training.

One prior art system disclosed in U.S. Pat. No. 5,163,130 issued to Hullot on Nov. 10, 1992 and assigned to NeXT Computer, Inc., advanced toward this goal by using graphical user interface techniques for the development and configuration of a graphical interface for programs that were already at least partially written. However, such a prior art system did not permit the development of complete, arbitrary, computer programs from a collection of subprograms. This is because the prior art system was limited in its ability to handle outlets.

An "outlet" is a data structure or object that provides information that is needed to create connections between a particular "source" object and one or more "destination" objects. According to the present state of the art, outlets are defined in "source" objects that are specifically designed to interwork with other objects. By virtue of an outlet's name each outlet provides to the user of a program configuration system an indication of the kind of "destination" object to which a source object must be connected to function properly.

SUMMARY OF THE INVENTION

It is an object of this invention to facilitate the creation of computer programs with a program configuration method and apparatus that allows variables and functional portions of one or more subprogram elements, and one or more graphic interface elements, to be linked to variables or functions in other subprogram elements, or graphic interface elements, such that the functionality of certain types of computer programs may be completely configured and prepared for execution without the user directly reading, writing, or editing the code of a particular computer language. The program configuration utility is provided for use in a computer system having a visual display on which an application program is represented by a graphic image, the application program having at least two subprograms, each having variables and action portions, or at least one subprogram and at least one graphic interface element. The program configuration utility makes it possible for a non-programmer or a person with only rudimentary programming skills to configure a collection of one or more subprograms into complete computer programs, without being limited to only configuring a program's user interface to non-visible, functional program elements.

In particular, the present invention improves on the prior art by providing a system and process that permits a subprogram to have an arbitrary number of outlets that may be defined at program configuration time by stimulating the subprogram to create new outlets that facilitate connecting the subprogram to other subprograms. In particular embodiments of the invention, the names for the new outlets may be either a) obtained by virtue of the attempted connection of a subprogram to other subprograms or b) provided by direct entry of the outlet name by a user of the program configuration system, e.g., by typing the outlet names on the keyboard. Additionally, in accordance with an aspect of the invention, outlets can be augmented to have one or more constraining parameters that can be used to ensure that only appropriate relationships are established by connections. Such constraining parameters include: a) number of connections allowed, b) types of connections allowed, c) destination object class, and d) destination object operations required.

BRIEF DESCRIPTION OF THE DRAWING

In the drawing:

FIGS. 8 through 13 show flow diagrams of a portion of the process for implementing the invention;

FIG. 14 shows a table of information stored in accordance with the present invention;

DETAILED DESCRIPTION

Figure 1:
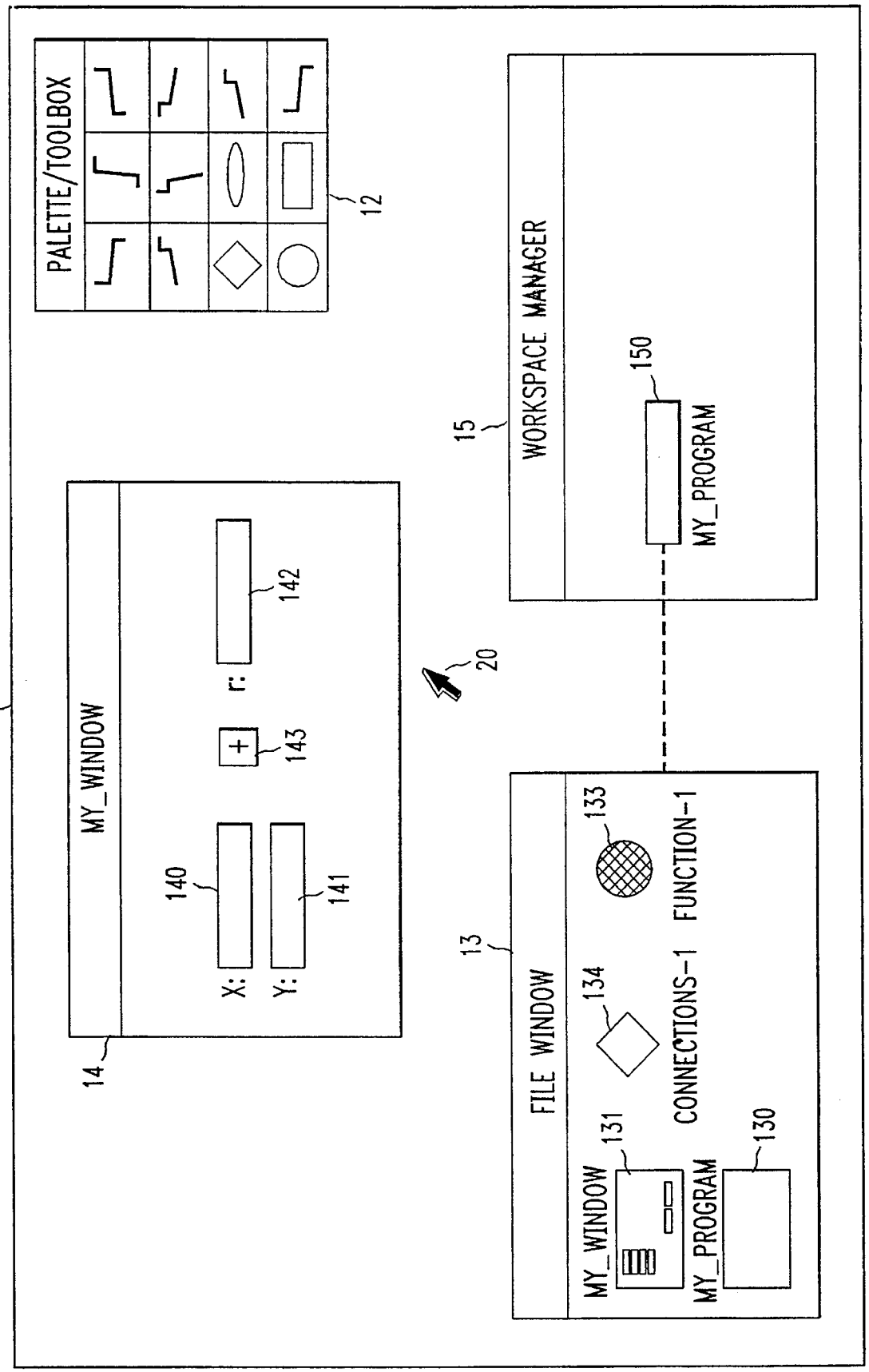
FIGS. 1, 2, 3, 6, and 7 show a screen display presented to a user of the computer program configuration system and method of the present invention.

Although the program configuration system of the present invention can be used on computers using any number of programming languages, it is best suited to use in conjunction with computers running object-oriented programming languages, and the preferred embodiment of the invention is designed for a computer that executes programs written in the C programming language. Therefore, the discussion that follows will be tailored at least in part to object-oriented programming, and to object-oriented C programming in particular. It is to be understood, however, that the present invention is not limited to systems that run object-oriented programming languages.

The program configuration system of the present invention is a self-contained utility that is separate from the programs it is used to configure. Any component functions, objects, and subprograms that are needed in a configured computer program, are assumed to be written, and generally capable of being executed, before using them with the program configuration system.

To understand the following description, it is necessary that several terms be defined.

An "object" is a self-contained collection of one or more data structures and related operations that are defined together in a particular subprogram.

A "connection" is an object created by a program configuration system to capture the details of a relationship between a "source" object and a "destination" object. Connections are established during the program configuration process and they are used by other objects at program execution time. Connection objects generally capture the relationship details shown in FIG. 14, which is described further below. A key function of the program configuration system of the instant invention is to facilitate the definition of connections between objects as needed to provide for appropriate inter-object interaction.

An "outlet" is a data structure or object that provides information that is needed to create connections from a particular "source" object and one or more "destination" objects. In accordance with an aspect of the invention, outlets are defined in, or created by the functional operation of, "source" objects that are specifically designed to inter-work with other objects. By virtue of an outlet's name, or an associated outlet variable's name, each outlet provides to the user of the program configuration system an indication of the kind of "destination" object to which a source object must be connected to function properly. In addition to the name, in accordance with an aspect of the invention, outlets have been augmented to have one or more constraining parameters that can be used to ensure only appropriate relationships are established by connections. Such constraining parameters include: a) number of connections allowed, b) types of connections allowed, c) destination object class, and d) destination object operations required.

The appropriate function of certain objects may, depending on the application design, require that their initial set of outlets be augmented (e.g. increased in number) during program configuration. In accordance with the principles of this invention, objects that provide for augmenting their initial set of outlets with additional outlets do so when stimulated to do so by a message from the program configuration tool. The outlets that are added to an original set of an object's outlets in this manner are herein referred to as "acquired" outlets and are individually assigned names by using the program configuration tool. The program configuration tool may provide for automatically naming acquired outlets by obtaining a list of names from functions of appropriate "destination" objects and/or by prompting the user to manually enter the desired outlet names, as by using a keyboard. In accordance with this invention, acquired outlets a) are displayed and annotated as such by the program configuration system, b) may be changed by the user of by using the program configuration system, and c) may have names that are particularly meaningful to the user, e.g., range names of a destination spread-sheet subprogram, or database properties.

Figure 17:
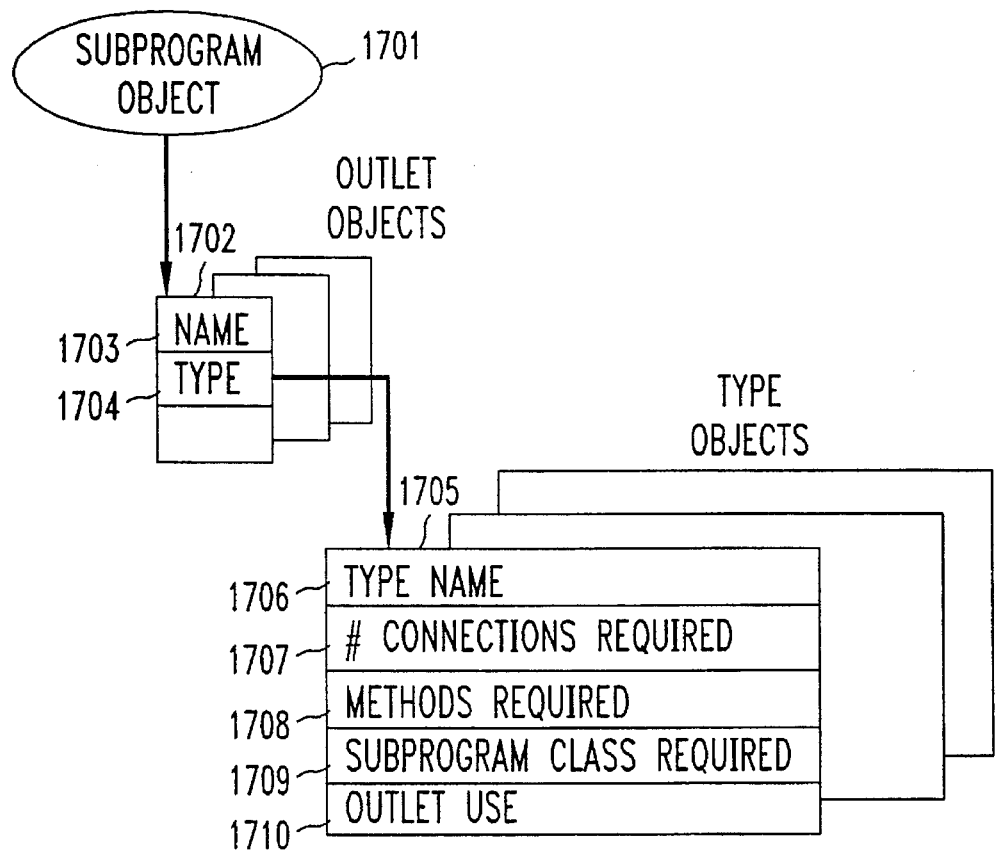
FIG. 17 shows the relationship between subprograms, their outlets, and outlet attributes.

To help explain the relationship between subprograms, their outlets, and outlet attributes, the reader's attention is directed at this time to FIG. 17. For clarity, for the following description of FIG. 17 only, outlets will be explicitly referred to as outlet objects. A subprogram object 1701 may have—i.e., have pointers to—one or more outlet objects 1702. Each outlet object 1702 has at least a name 1703, and may have—i.e. have pointers to—one or more named connection type objects 1705. Each connection type object 1705 has a name 1706 and various parameters that describe, for example, a) the number of connections required 1707, b) the methods 1708 (used herein as a term of art, i.e. functional subroutines) required in a target subprogram, c) the required class of target subprogram 1709, and d) an indicator parameter 1710 describing the possible use of the outlet, e.g. whether the outlet may be used for the purpose of acquiring other outlet names from a target subprogram.

Turning now to FIG. 1, there is shown a representation of a computer display that is seen when 1) a user has entered the program configuration system of the invention, 2) has identified to the system the program file for the program to be configured, and 3) has identified needed component subprograms and graphic interface fields for use in the configured program. In this case, the configured program, named MY_PROGRAM, is a simple program for taking two numbers, x and y, as inputs and displaying their sum as the result, r. Display 10 shows the program configuration system. File window 13 contains a graphic element representing MY_PROGRAM 130, a graphic element 131 representing MY_WINDOW 14, a graphic element representing a subprogram called FUNCTION-1 133, and a graphic element representing another subprogram named CONNECTIONS-1 134. The user can open and close MY_WINDOW 14 by clicking on its graphic element 131.

The user has defined MY_WINDOW 14 to contain 1) field 140 preceded by a text label "x:", 2) field 141 preceded by a text label "y:", 3) field 142 preceded by a text label "r:", and 4) a button 143 labeled "+". MY_WINDOW 14, fields 140–142 and button 143 were created by the user selecting from palette/toolbox 12 the appropriate item and copying the selected item to the location on display 10 that is desired. The program is used by moving pointer 20, representing the mouse cursor, to field 140 and clicking the mouse button, thus allowing entry of the value x, then doing the same with field 141 to enter the value y, then moving the pointer to button 143 and clicking, which causes the combination of subprograms used within MY_PROGRAM 130—in this case CONNECTIONS-1 134 and FUNCTION-1 133—to compute the value of r to be displayed in field 142.

One way to make such a program work, in accordance with the principles of the invention, is to separately configure subprograms that contain objects written for use in a larger program, and link them together and to a user interface subprogram that provides a display having a number of user interface fields, e.g., fields 140–143 of $MY_{13}$ WINDOW 14. FUNCTION-1 133 is one such configurable subprogram object, being, in this example, a particular spread-sheet subprogram object that provides the complete program logic needed to compute sums of this particular type. "CONNECTIONS-1" 134 is another such subprogram object, it being a connection function that provides a synchronous triggering capability. Once all of the subprograms, e.g., the code for controlling MY_WINDOW 14, FUNCTION-1 133, CONNECTIONS 1-134, are written, they may be linked together to define a complete working program. To do so, it is necessary to provide a graphic image representing the subprograms called "FUNCTION-1" and "CONNECTIONS-1" in palette/toolbox 12 and to copy each of them at least once into the program file window 13 discussed above. Like other functions represented on the palette/toolbox, FUNCTION-1 133, CONNECTIONS-1 134 must be at least partially written in advance, so that each such function or subprogram is generally executable when its representation is stored in palette/toolbox 12. Those skilled in the art will know how to make such subprograms.

Figure 2:
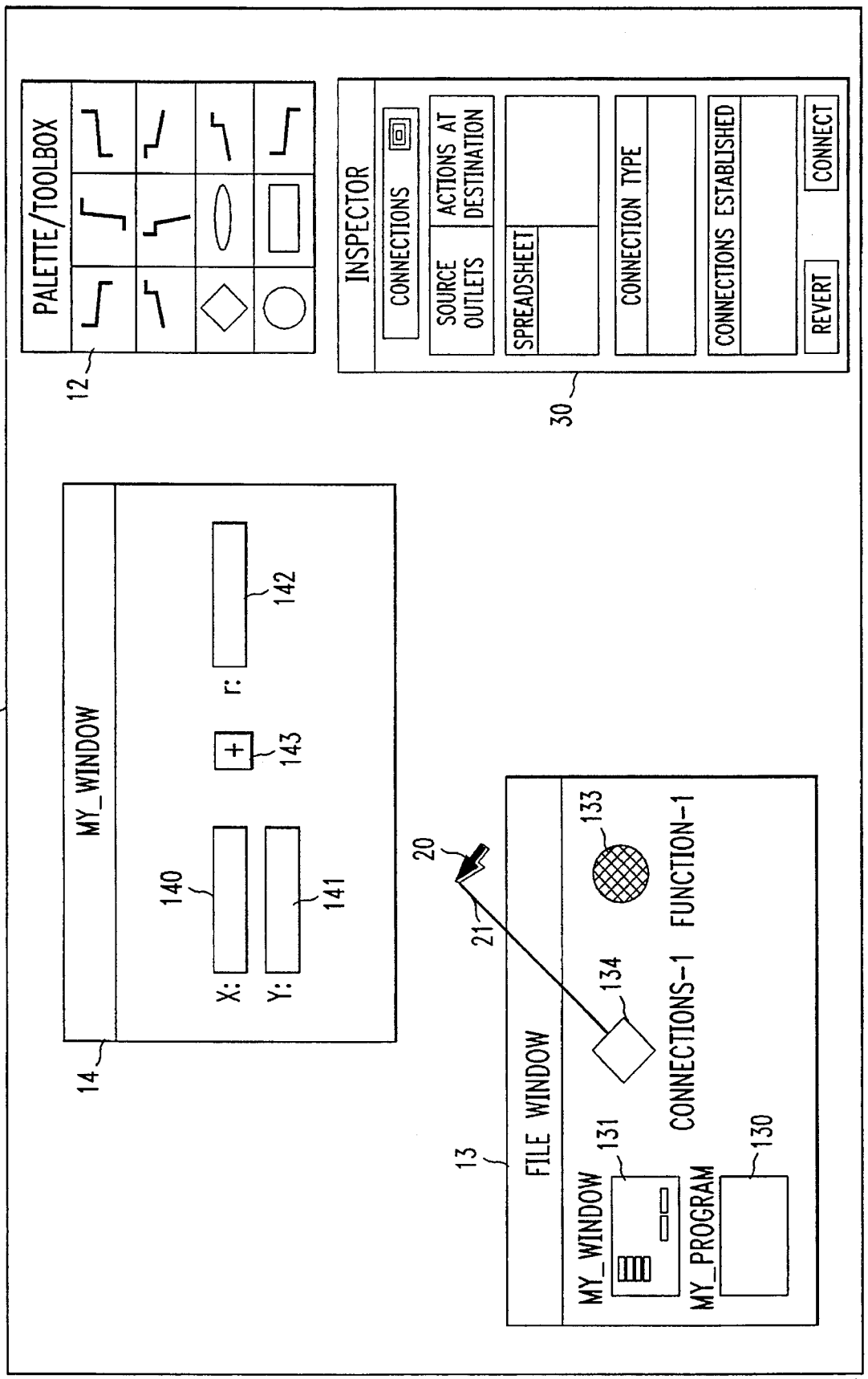
Figure 3:
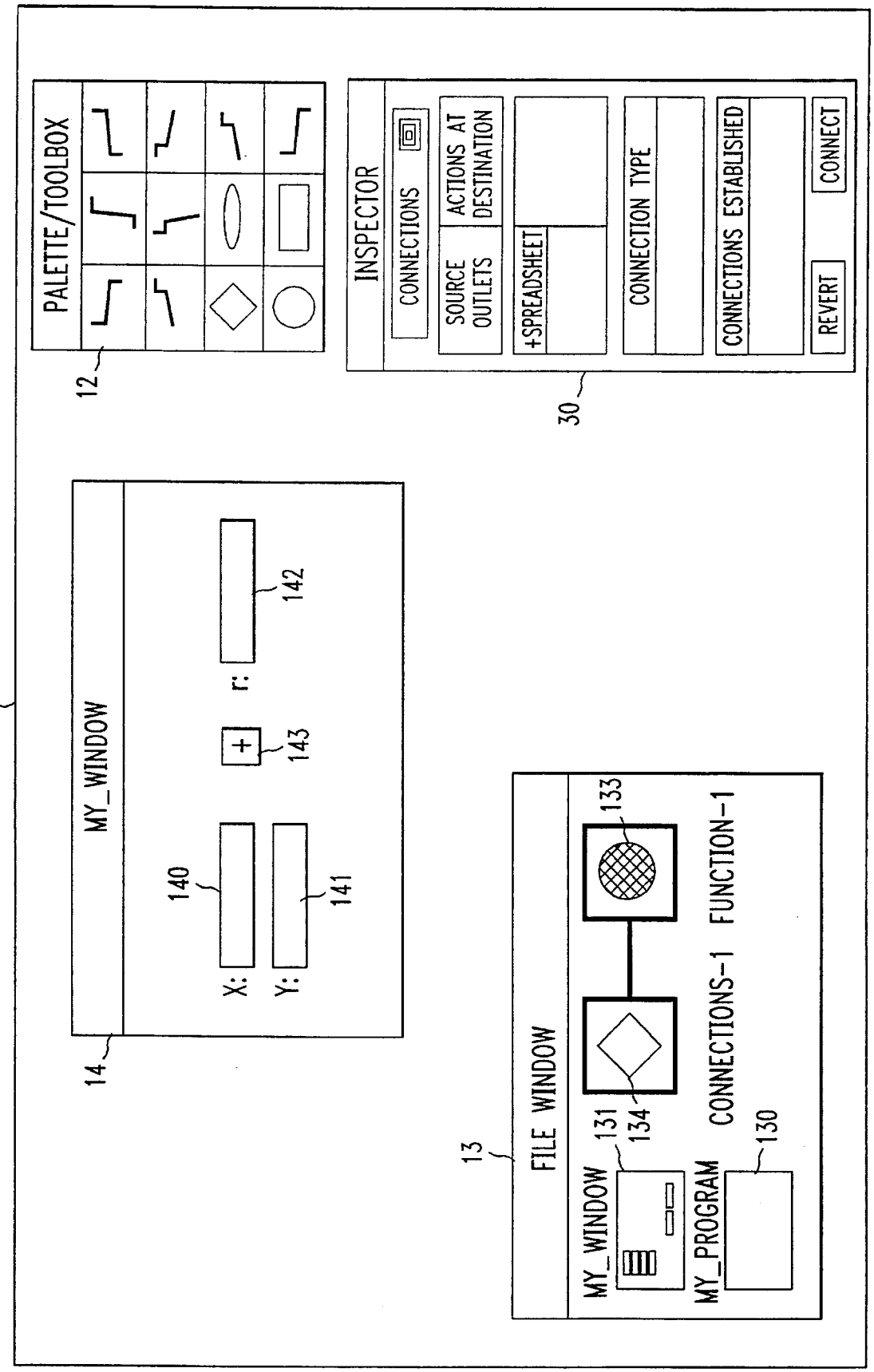

To establish the needed connections, the program configuration system is used in the following exemplary manner:

To specifically associate subprogram CONNECTIONS-1 134 to subprogram FUNCTION-1 133, the user selects CONNECTIONS-1 134 by moving pointer 20 to its graphic representation in File Window 13 and clicking the mouse button while holding down the control (CTRL) key on the computer keyboard. Although not the case in FIG. 1, there may be more than one other subprogram from which to choose. As shown in FIG. 2, while continuing to hold the mouse button down—the control key can be released—the user moves the mouse to move pointer 20 toward the particular subprogram of interest, drawing line 21, from the initially selected subprogram representation, e.g., CONNECTIONS-1 134. When the line reaches the subprogram of interest, e.g., FUNCTION-1 133, the user releases the mouse button, resulting in a connection between the two subprograms being highlighted. Such a highlighted connection is shown in FIG. 3. At this point, inspector window 30 appears on display 10, unless it was already present from a previous activity.

Figure 4:
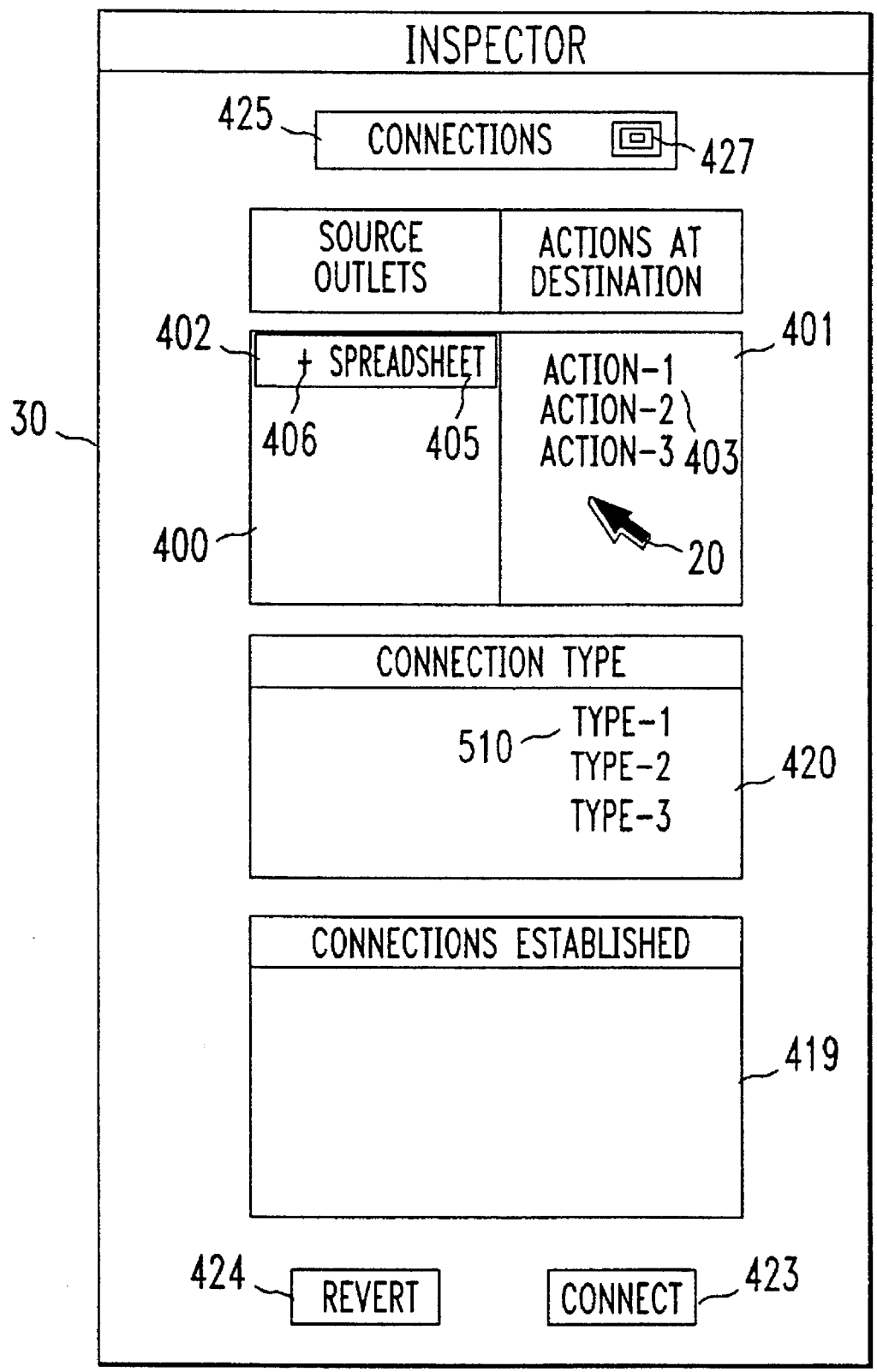
FIGS. 4, and 5 show a portion of the screen display of FIGS. 3 and 6, respectively.

FIG. 4 shows a more detailed view of inspector window 30. In the mode of operation shown, known as linking or "connections" mode, the function of inspector window 30 is to a) display the outlets of the last selected subprogram, e.g., CONNECTIONS-1 134, in subwindow 400, b) display the appropriate executable functions of a target subprogram, e.g., FUNCTION-1 133, in a separate subwindow 401, to which other subprograms, or graphic elements may be linked, c) to display the types of connections allowed from the selected outlet to the selected subprogram (e.g., TYPE-1 501, FIG. 5), and d) to facilitate the making of such linkages or connections. Subwindow 400, labeled "Outlets", lists initial variables of the selected subprogram, in this case CONNECTIONS-1 134. Subwindow 401, labeled "Actions at Destination", lists target subprogram function routines available for connection, in this case, a set of appropriate functions available within FUNCTION-1 133.

Figure 5:
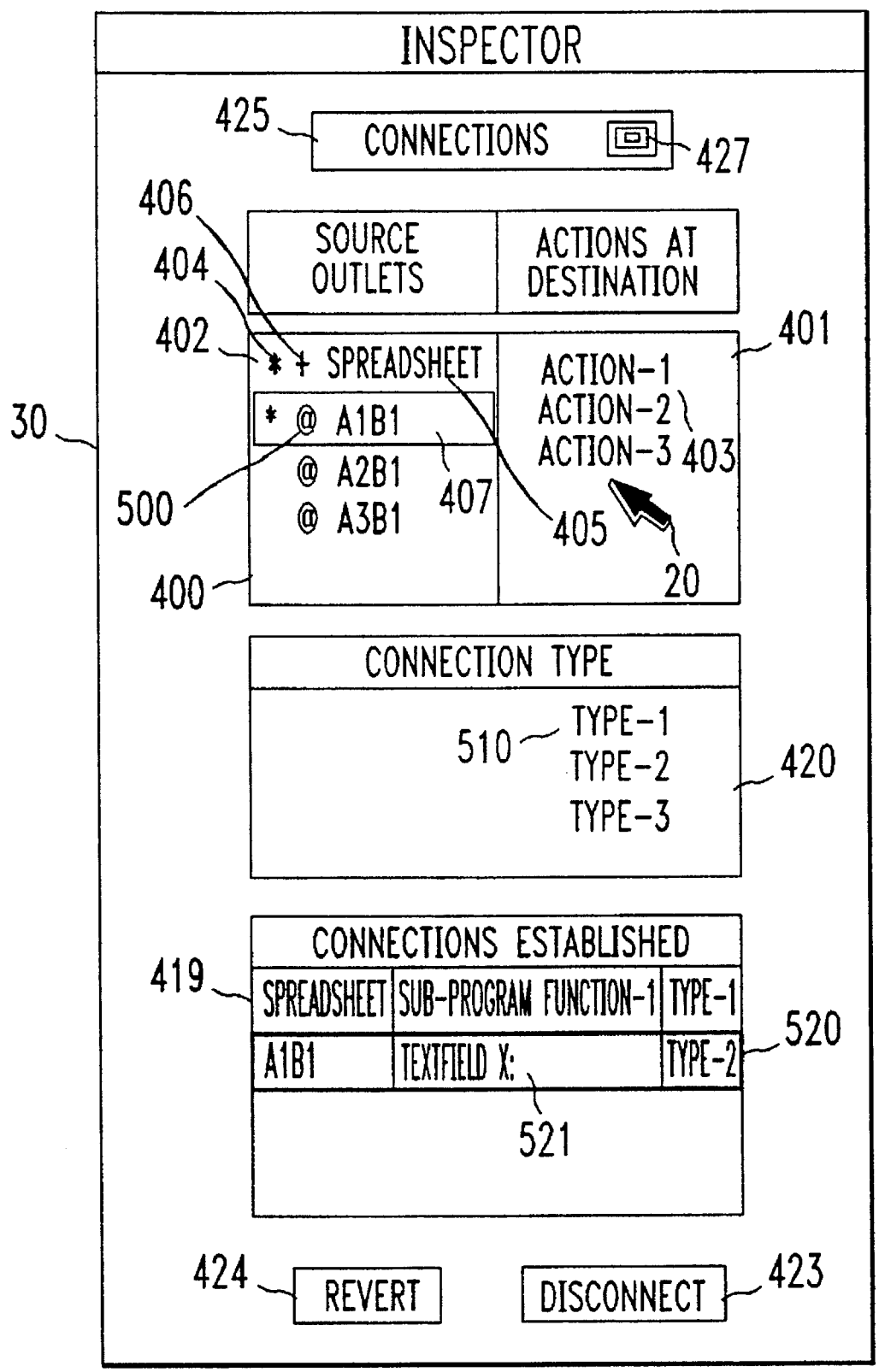
Figure 16:
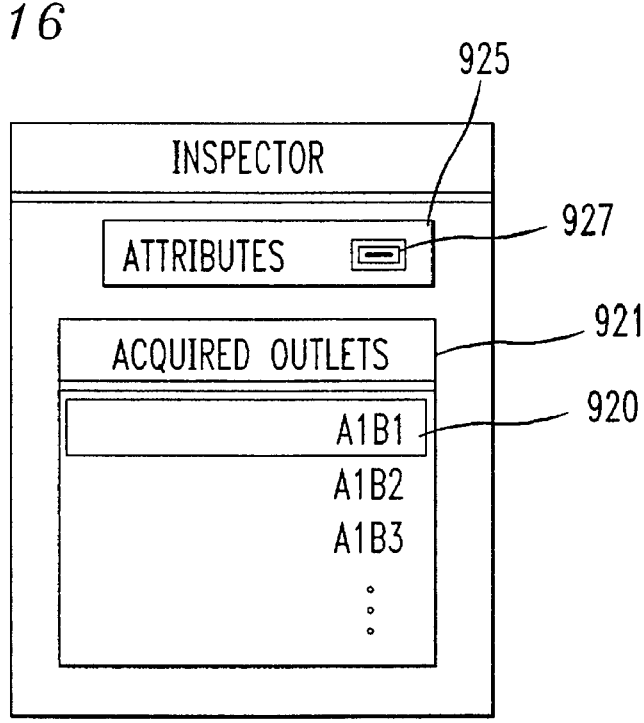
FIG. 16 shows a portion of the screen display of FIG. 6.

As implied above, inspector window 30 has several different modes of operation. Inspector window 30 contains mode subwindow 425 which displays the current mode of operation of inspector window 30. As shown in both FIGS. 4 and 5, inspector window 30 is in the "Connection" mode. FIG. 16 shows the inspector of FIG. 5 in the "attributes" mode. Inspector window 30 also has "buttons" 423, 424 and 427, each of which initiates a particular function when clicked on with the mouse. Button 423, currently labeled "Connect", serves both connect and disconnect functions and may at times be labeled "DISCONNECT", as described in more detail below and as shown in FIG. 5.

The user selects one of the outlets in subwindow 400 by positioning pointer 20 over the name of the outlet and clicking the mouse button. The user may then associate the selected outlet with one of the actions available within the destination subprogram. This is done by positioning the pointer 20 over the descriptive words in subwindow 401 and clicking the mouse button again. If more than one connection type may be specified for a proposed connection, the available types will be listed in subwindow 420. The user selects or changes the type of connection by positioning pointer 20 over the name of the desired connection type and clicking the mouse button.

A connection of the selected type between the selected subprogram and the corresponding action within the target subprogram is then made by positioning pointer 20 over the "Connect" button 423 and clicking the mouse button. In the present example, at program run-time, when the sequence of program instructions previously defined within subprogram CONNECTIONS-1 134 causes it to send an action message to another subprogram pointed to by the linked outlet, the particular action message selected for that connection in inspector window 30 will be sent, in this case to FUNCTION-1 133.

In accordance with the present invention, the user may from time to time specify a desired connection between arbitrarily selected source and destination objects. As described above, this is generally done by positioning pointer 20 over the source object representation on the screen and drawing a line as described above to some destination object, and releasing the mouse button. Each time this is done by the user, inspector window 30 associated with the source object is displayed by the system and the outlet variable names of the source object are listed in inspector window 30. When a particular outlet in inspector window 30 is subsequently selected and/or highlighted, the system obtains from the destination object all of the information needed to determine a) what type of connections may be made to the destination object, b) how many connections may be made to the destination object, and c) what destination object functions may be triggered by messages from the highlighted outlet to the destination object. The information thus obtained from the destination object is used to determine what functions and connection types are listed as options for the user to select in inspector window 30. In accordance with an aspect of the invention, the user is limited by the system to selecting only the type and number of connections that are appropriate for the selected destination object. Advantageously, such connections will trigger only meaningful functions in the destination object.

In accordance with the present invention, "source" outlets in certain subprograms provide for acquiring and using additional outlets from one or more destination subprograms. Source subprograms and outlets of this particular type, when connected to an appropriate destination subprogram, will cause the source subprogram to acquire additional outlets that are then also listed in subwindow 400. In addition, source outlets that are themselves acquired by certain subprograms may also provide for acquiring additional source outlets when connected to appropriate destination subprograms. As shown in FIG. 5, acquired outlets are also listed in subwindow 400 at the time they are acquired and remain listed until either some other source object is selected or the outlet that caused the acquired objects to be acquired is itself disconnected. Within subwindow 400, a) symbol "@" 500 is listed next to any acquired outlets and b) symbol "+" 406 is listed next to any outlet that, in the context of the selected subprogram, provides, or may provide for acquiring source outlets from a destination subprogram. Asterisk symbol "*" 404 is also listed next to any outlets that are used in one or more connections between a source and destination subprogram.

In accordance with the present invention, objects that must provide for the synchronous copying of data from numerous source variables to a target object are particularly suited for using acquired outlets. In the present example, numerous user interface objects are connected to the object represented by CONNECTIONS-1 134 which is in turn connected to the object FUNCTION-1 133, a particular spread-sheet. The CONNECTIONS-1 134 object is provided with the ability to acquire additional outlets from any spread-sheet to which it is connected via the particular outlet named "SPREADSHEET." Outlets thus acquired are understood to be range names of the target spread-sheet. Having once acquired such outlets, the acquired outlets are available for connection to other objects, including, but not limited to, objects providing the user interface. However such acquired outlets, and in particular the messages transmitted to other objects connected to them, are still controlled by the acquiring object. The synchronization of messages to destination objects is, therefore, readily provided by the acquiring source object, and may be triggered, for example, by a single message to the destination object generated by a single button click captured by the user interface.

Similarly, objects designed to connect to database modules may be also be readily prepared to acquire outlets that correspond to database properties. Objects that have acquired outlets representing database properties are particularly useful for collecting and synchronizing the collection of data needed to formulate a database query, for example.

In accordance with an aspect of the invention for certain types of acquiring objects, the outlets to be acquired may be specified by allowing the user to directly enter the outlet names in inspector window 30 (FIG. 6) when the inspector is in the "attributes" mode, as shown in FIG. 16. At any time inspector window 30 is displayed in the attributes mode the user may enter new outlet names by highlighting blank space in outlet list 921 and typing in the desired outlet names. Alternatively, the user may highlight existing acquired outlets in the list and change the outlet name by typing over the highlighted name. Objects that acquire outlets in this manner are particularly useful when they are designed to provide multiple, synchronized logical, arithmetic or syntactic comparisons. For example, by virtue of having one object acquire multiple outlets in this way, multiple individual, yet simultaneous, comparisons may be triggered by one event or message from another object and a single resulting outcome may be delivered to one or more other objects.

Figure 6:
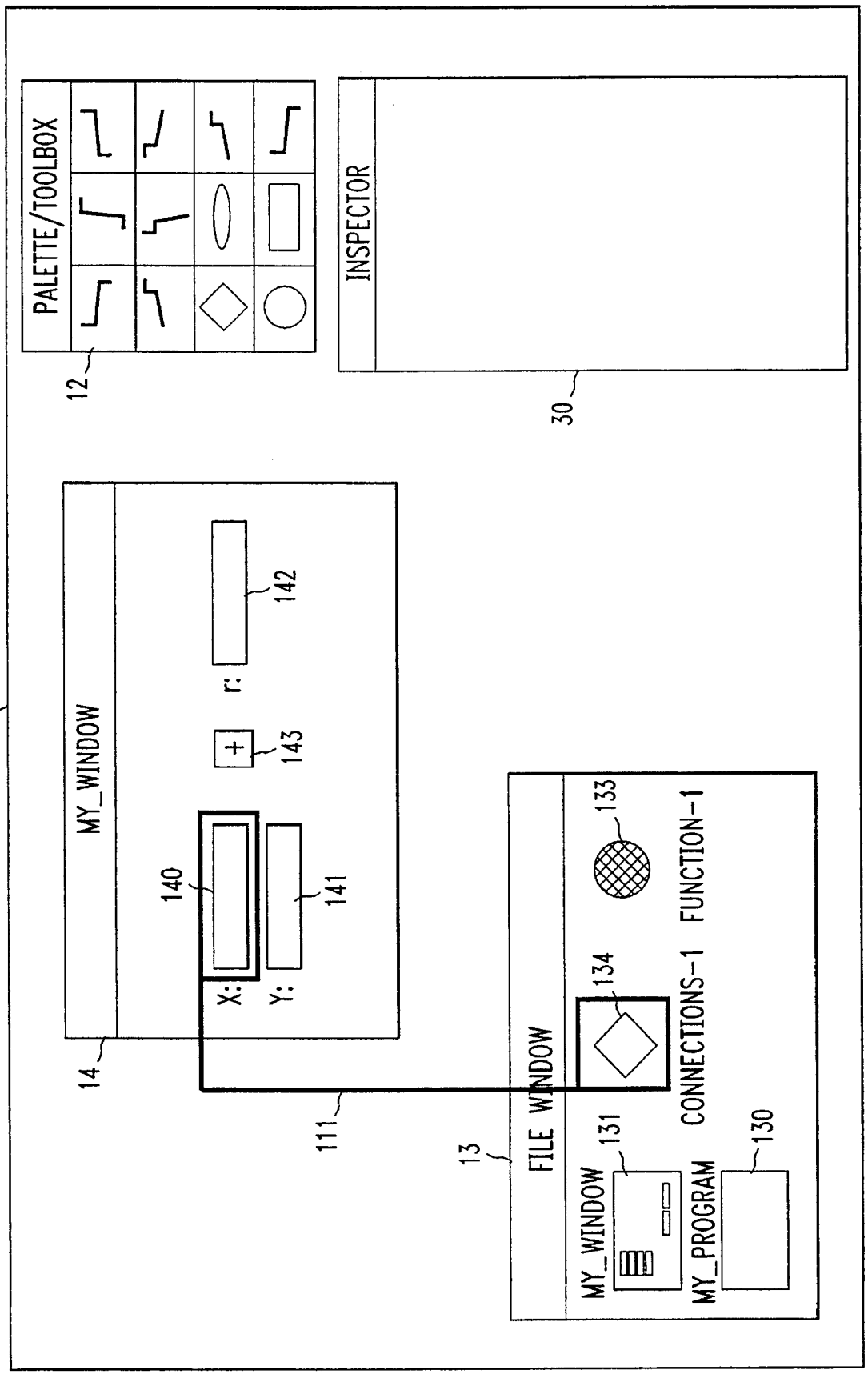

FIG. 5 shows inspector window 30 after the variables of a destination subprogram, e.g., variables from FUNCTION-1 133 (FIG. 1), are automatically and directly acquired—and thus adopted by the functional routines of the selected subprogram, e.g., CONNECTIONS-1 134—and displayed in subwindow 400. The user moves pointer 20 to the desired variable, e.g., variable A1B1 407 (FIG. 5), and clicks the mouse to highlight it. As shown in FIG. 6, once a variable is thus highlighted, the user then again clicks the mouse while pointer 20 (FIG. 1) is positioned over the subprogram graphic representation associated with the current inspector window 30, and draws another line 111 (FIG. 6), to another subprogram, or in this case an interface field 140 on the display.

When the mouse pointer approaches any field defined in the program user interface—or any other subprogram in the file window 13 (FIG. 1)—the target field—or subprogram, as the case may be—will be highlighted. When the user releases the mouse button at the time a field or subprogram is thus highlighted, a visible connection between the source and the destination objects is drawn to show the pending logical connection. When the pending logical connection is shown, a) the corresponding source outlet is highlighted in subwindow 400 (FIG. 4), b) the selected action at the destination is highlighted in subwindow 401, c) the selected connection type is highlighted in subwindow 420, and d) if it is an existing connection, it will be listed in subwindow 419 along with other connections from other selected object outlets. The user may further indicate or change the type of proposed connection to be made by clicking the mouse button while pointer 20 is positioned a) over words 510 in the "Connection Type" subwindow 420, b) words 407 in the "Source Outlets" subwindow 400, or c) words 403 in the "Actions at Destination" subwindow 401.

If a proposed connection is confirmed, by pressing "Connect" button 423, the connection will a) be established and b) listed in subwindow 419 with a highlighted display. When an outlet is first connected, an indicator, such as asterisk 404, appears next to the outlet name in subwindow 400, indicating that the outlet is connected at least once. The label of the CONNECT/DISCONNECT button 423 changes to "DISCONNECT", as shown in FIG. 5, when a particular connection is selected and highlighted in subwindow 419. Each selected connection and its type will remain in the list of subwindow 419 until the mouse is clicked when pointer 20 is over a particular connection and again clicked on button 423 labeled "DISCONNECT".

If, when inspector window 30 is first opened, there are already connected outlet names listed in the subwindow 400, e.g., from a previous connection operation, then asterisk 404 will already be displayed for each connected outlet. If the user highlights an outlet name that is already connected, a line, such as line 111 (FIG. 6) will be displayed, showing the first connection in the connection list involving the selected outlet to a interface field or subprogram. Other lines will be displayed when the user clicks the mouse button while pointer 20 is over other connections in subwindow 419. This allows connections to be checked, either to make sure they are correct, or to find out what they are. If the user had drawn line 111 (FIG. 6), intending to connect an unconnected outlet, but highlights an outlet connected to some other graphical representation by mistake, line 111 will disappear, and will be replaced by a line between the field or subprogram to which that outlet is connected and the selected subprogram, e.g., CONNECTIONS-1 134. In one embodiment, line 111 must be redrawn by the user before the selected outlet 407 can be connected to another field or subprogram. An "Undo" function may be provided that will unhighlight the already connected outlet and restore line 111 automatically. Again, whenever a connection is displayed, button 423 will be labeled "DISCONNECT" and the user has the option of clicking that button to DISCONNECT the outlet or ignoring the DISCONNECT button and choosing another outlet, connection, connection type, or action.

In accordance with an aspect of the invention, if any outlet in a particular subprogram provides for acquiring additional outlets from a destination subprogram to which it may be connected, inspector subwindow 400 lists that outlet name along with a special indicator, e.g., "+" symbol 406. The user is thus made aware that the particular subprogram may acquire additional outlets if it is connected to one or more other cooperating sub-functions.

In accordance with an aspect of the invention, if a connection is made from an outlet in a particular subprogram, e.g., CONNECTIONS-1 134, that provides for the acquiring of additional outlets from the destination subprogram to which it is connected, e.g., FUNCTION-1 133, additional outlet names are automatically acquired and listed in the same subwindow 401, along with "@" symbol 500. The user is thus made aware that acquired outlets and their connections are dependent on some other connection already made.

In one embodiment of the invention, all outlet names have a set of "Connection Types" associated with them, and, as described above, one particular connection type is selected for each connection prior to establishing it. When a particular outlet in subwindow 400 is highlighted, its currently selected connection type is listed and highlighted in subwindow 420. The user changes the selection by positioning pointer 20 over the words for the desired connection type 510 in subwindow 420 and clicking the mouse button.

The above process can be repeated until all fields, or outlets in other subprograms are connected to the needed outlets and actions of the other needed subprograms. In the present example, the three fields 140, 141, 142 are all linked to outlets A1B1, A2B1, and A3B1 in CONNECTIONS-1 134 subprogram, which itself has four outlets A1B1, A2B1, A3B1, and SPREADSHEET linked to FUNCTION-1 133. In addition, an outlet of field 143 is also linked to an action in CONNECTIONS-1 134 subprogram which itself triggers the required operation of the connected FUNCTION-1 133.

In one embodiment of the invention, only variables or functions designated "outlets" can be connected to a subprogram. Therefore, when an action is to be invoked in a destination subprogram, it is triggered by a message to an outlet that supports the type of connection that carries action messages to destination subprograms. The particular action messages that an outlet can deliver to a destination subprogram are listed in subwindow 400 during the action connection process, as shown in FIG. 5. All of the types of connections that are supported by a highlighted outlet name are listed in connection type window 420.

As in the case of all outlets, an asterisk or other indicator (not shown) is displayed next to the name of a connected action, and when both are highlighted, button 423 becomes a "DISCONNECT" button. Similarly, existing connections to a subprogram will be displayed if a connection action is highlighted.

Figure 7:
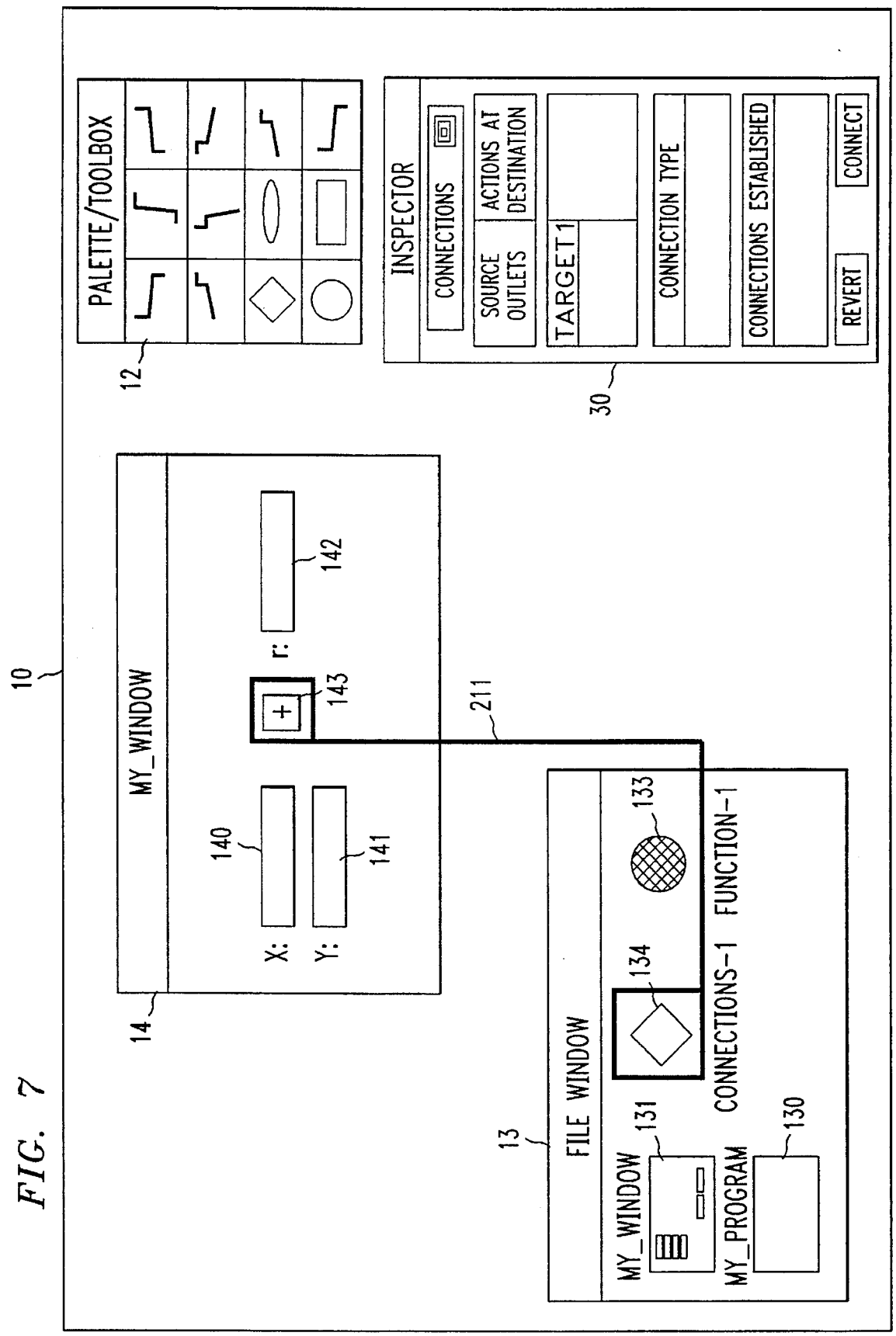
Figure 8:
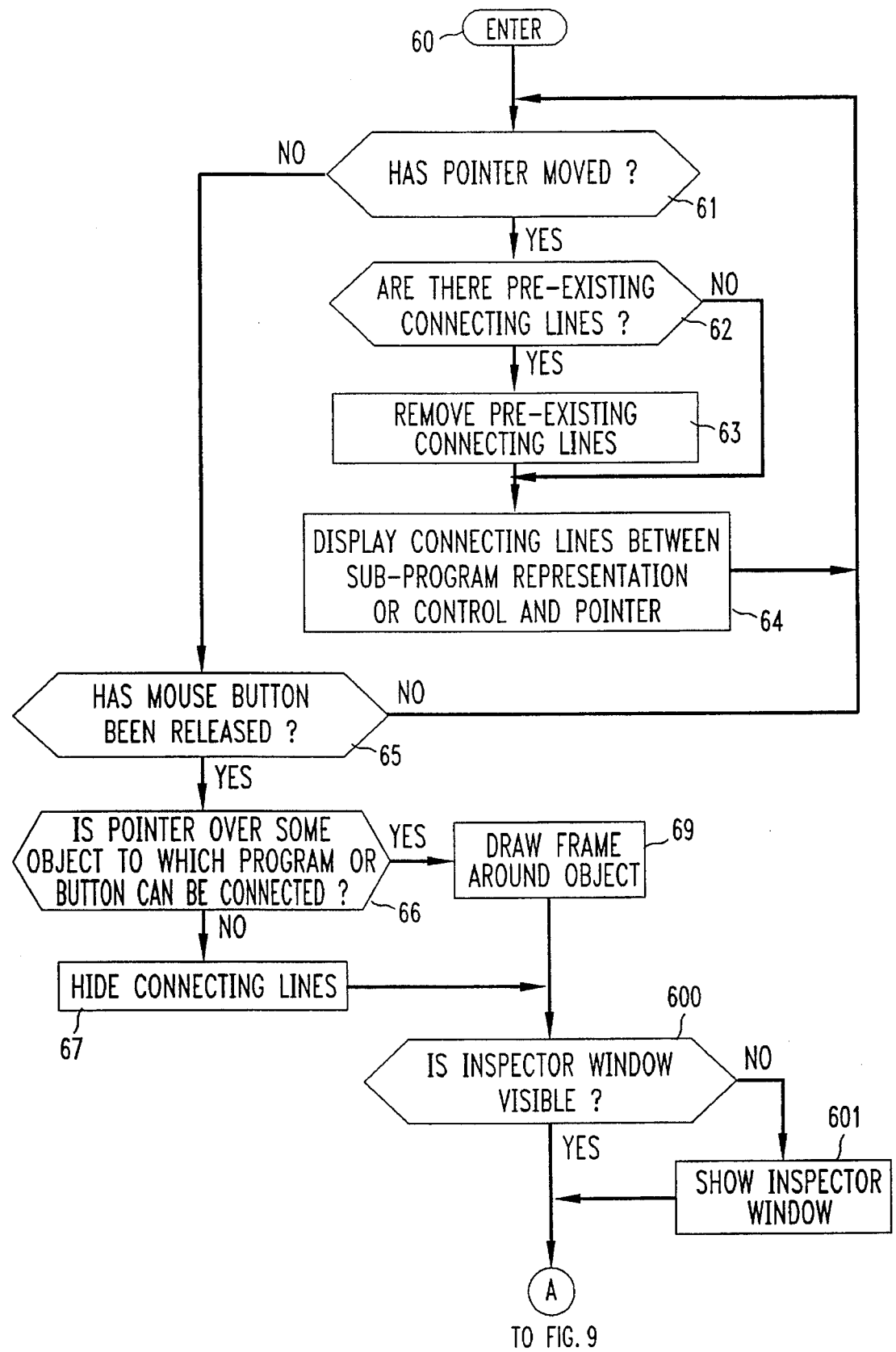

In this example, clicking the mouse button while pointer 20 is over "+" button 143 will be used to trigger subprogram CONNECTIONS-1 134 to provide the proper action messages to trigger operation of FUNCTION-1, in accordance with an aspect of the invention. To establish this linkage, the user of the program configuration system selects graphic element 143 representing the "+" button function by positioning pointer 20 over the "+" button, clicking the mouse button, and drawing a line (not shown) to the graphic element of CONNECTIONS-1 134 subprogram in the program File Window 13. As shown in FIG. 7, when the mouse button is released, link 211 between the two graphic elements will displayed. Upon establishing this link an inspector window (not shown) similar to inspector window 30 but associated with the first selected graphic element—in this case the "+" button 143—becomes visible and may be used as described above for making, changing, or reviewing connections from outlets defined in the "+" field subprogram to actions defined in the "CONNECTIONS-1" subprogram 134.

In the case, referred to above, when a program already exists, its characteristics and subprograms are made available to the program configuration system of the present invention through a facility of the operating system known as the workspace manager. The workspace manager provides window 15, shown in FIG. 1, in which representations of various available files are displayed. By a) highlighting the graphical representation of the already existing program, e.g., of MY_PROGRAM, in workspace manager window 15, b) dragging it to File Window 13, and c) dropping it therein, the user makes the characteristics of the already existing program, e.g., MY_PROGRAM, known to the program configuration system.

When a program has been configured and the user signifies completion of the configuration process by selecting "Save" from a menu (not shown), the program configuration system stores in a file a list of all programming objects related to each of the subprograms and the graphical user interface, if any, and a list of connections. For each connection specified by the user, the system stores, as part of the program configuration file, a copy of table 501, shown in FIG. 14. Each such copy of table 501 contains a) type of connection field (type) 502, in the form of an index into a list of various connection types, b) source subprogram field (source) 503 and destination subprogram field (destination) 504, both in the form of pointers to the correct object in the object list, and c) the names of the outlet variables in outlet field 505 and the action functions, if any in action field 506. In addition, for each connection made by the user, the system stores in table 501, in owner field 507, the outlet variable name that was used to acquire the outlet named in outlet field 505 involved in the particular connection, if any. When the program configuration file, including one or more tables 501, has been saved, the work of the program configuration system of the invention is complete.

The program configuration system provides a program, the first line of which is an instruction to load and execute the program configuration file. Execution of the configuration file loads the correct files, makes the appropriate connections, based in pan on the one or more tables 501, and demonstrates the correct functionality resulting from the interactions among the various subprograms and their connections to each other.

FIGS. 8 through 11 show a flow diagram of a process, hereinafter referred to as the Main Connection Process, which is invoked, at step 60, when a user presses a mouse button while the CTRL key is down and pointer 20 is over a subprogram representation such as FUNCTION-1 133 and CONNECTIONS-1 134, or over a screen button object such as button 143. Conditional branch point 61, tests to determine if the pointer has moved. If the test result in conditional branch point 61 is YES, indicating the pointer has moved, then conditional branch point 62 tests to determine if there are pre-existing connecting lines. If the test result in step 62 is YES, indicating that there are pre-existing connecting lines, they are removed from the screen in step 63. If the test result in step 62 is NO, or after execution of step 63, control passes to step 64, in which new connecting lines between the selected subprogram, e.g., CONNECTIONS-1 134, and pointer 20 are displayed. Control then passes back to step 61 to check for further pointer movement.

If the test result in step 61 is NO, indicating that the pointer has not been moved, control passes to conditional branch point 65, which tests to determine if the mouse button has been released. If the test result in step 65 is NO, indicating that the mouse button has not been released, control passes back to step 61 to continue checking for pointer movement. If the test result in step 65 is YES, indicating the mouse button has been released, control passes to conditional branch point 66, which tests to determine if pointer 20 is over a type of object to which sub-program CONNECTIONS-1 134—if the connecting line starts there—or the button depicted at 143—if the connecting line starts there—can be connected.

If the test result in step 66 is NO, indicating that the mouse button was released but that pointer 20 is not over an object to which a connection can be made, then, in step 67 any displayed connecting lines are hidden and the Main Connection Process is exited in step 68. The system then waits for the user to select another task.

If the test result in step 66 is YES, indicating that the pointer is over an object to which a connection can be made, control passes to step 69 in which a frame is displayed around the object, thus highlighting it. In either case, after step 69 or 67, conditional branch point 600 tests to determine if inspector window 30 is visible. If the test result in step 600 is NO, indicating that inspector window 30 is not visible, it is made visible at step 601. If the test result in step 600 is YES, or after execution of step 601, control passes to conditional branch point 602, (FIG. 9) which tests to determine if inspector window 30 is in the connection mode. If the test result in step 602 is NO, inspector window 30 is not in the connection mode, control is passed to step 603 in which inspector window 30 is set to the connection mode at step 603. If the test result in step 602 is YES, or after execution of step 603, control passes to step 604, in which the available program outlets are displayed the left-hand column of inspector window 30.

Next, conditional branch point 630 tests to determine if any outlets displayed by step 604 are already connected. If any outlets are already connected, conditional branch point 631 tests to determine if all of the possible acquired outlets are listed in inspector subwindow 400 (FIG. 5). If the test result in step 631 (FIG. 9) is NO, control passes to step 632, in which all acquired outlets not already listed are added to the list at step 632. Control then passes back to conditional branch point 631 to test if all possible acquired outlets are listed.

After possibly several cycles, when all outlets and acquired outlets have thus been identified and listed, the test result in step 631 becomes YES, and control passes to step 633, in which any listed outlets are marked with asterisk 404 (FIG. 5) if they are used in one or more connections to one or more destination subprograms. In step 634 (FIG. 9), acquired outlets are marked with an "@" symbol 500 (FIG. 5) next to the outlet name, in accordance with an aspect of the invention. Thereafter, in step 635 (FIG. 9), a list of all connections from the selected source subprogram or field is displayed in subwindow 400 (FIG. 5). If the test result in step 630 (FIG. 9) is NO, or after execution of step 635, control passes to step 636, in which the displayed outlets, whether or not connected, that provide for acquiring additional outlets from a destination subprogram are marked with "+" symbol 406 (FIG. 5) next to their name. Next, in step 638 (FIG. 9) the first outlet listed by either steps 604 or 632 that is available for making a connection is highlighted. Then at step 637, a list of connection types supported by the highlighted outlet in subwindow 400 (FIG. 5) is displayed in subwindow 419 in accordance with an aspect of the invention.

Figure 10A:
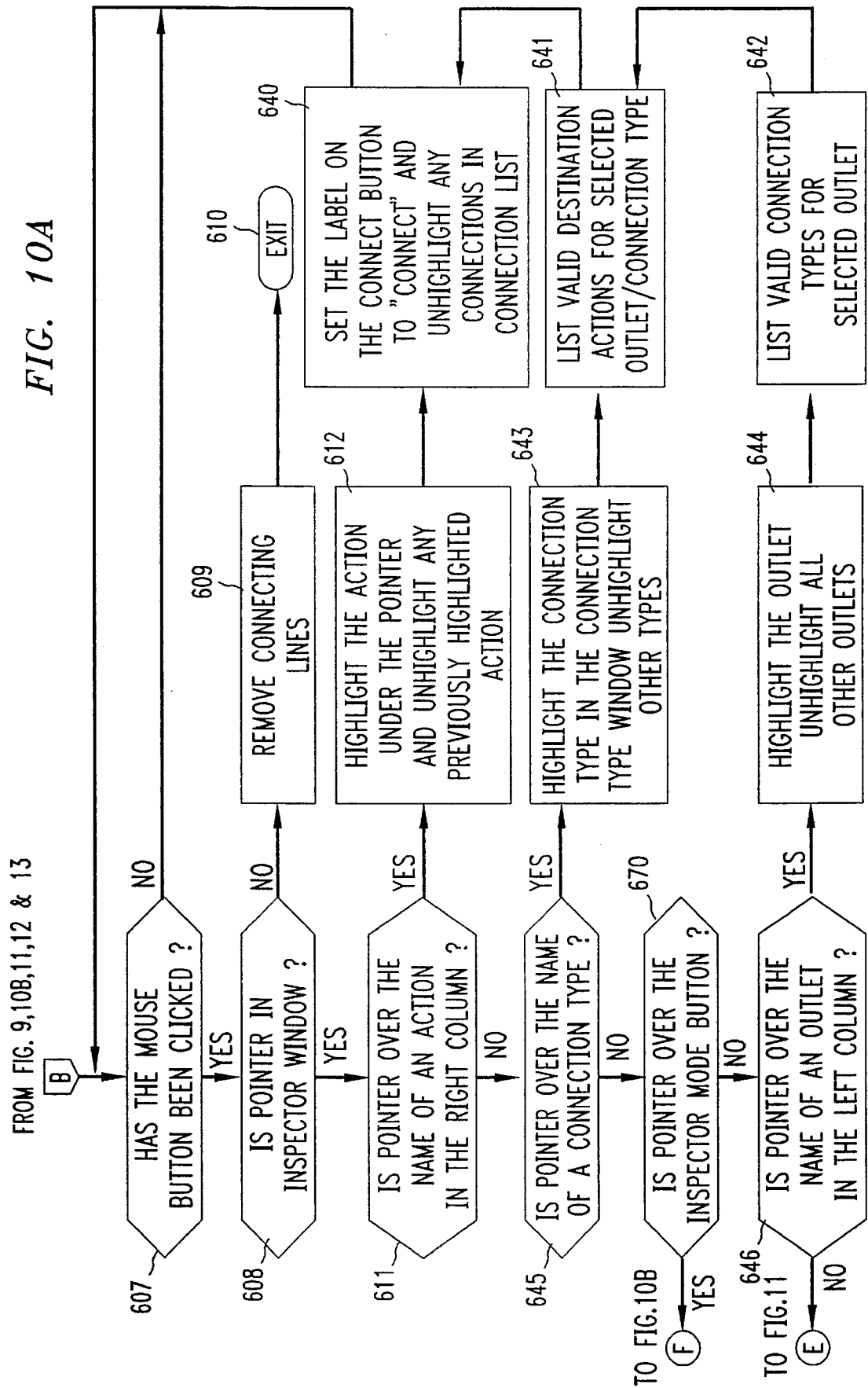
Figure 10B:
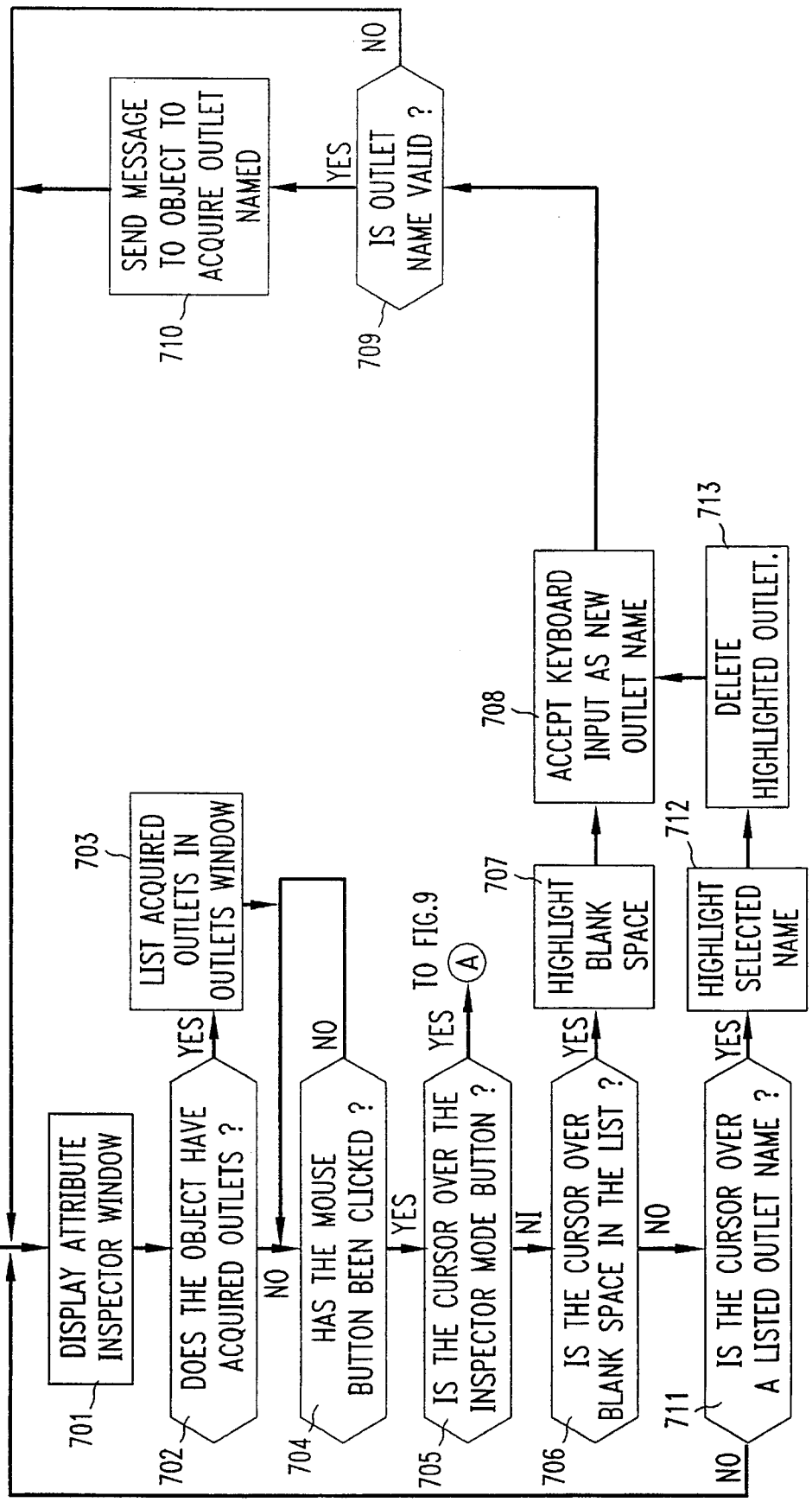

Control passes to step 607, shown in FIG. 10A, which tests to determine if the mouse button has been clicked. If the mouse button has not been clicked at step 607 (FIG. 10A), the system continues to await a click at step 607. If the test result in step 607 is YES, indicating that the mouse button has been clicked, control passes to conditional branch point 608 which tests to determine if pointer 20 (FIG. 5) is within inspector window 30. If pointer 20 is not within inspector window 30, the test result in step 608 (FIG. 10A) is NO, and all connecting lines are removed from the screen at step 609. The Main Connection Routine is then exited in step 610.

If the test result in step 608 is YES, indicating that pointer 20 (FIG. 5) is within inspector window 30, conditional branch point 611 (FIG. 10A) tests to determine if pointer 20 (FIG. 5) is over the name of a destination action in right-hand column 401 of the inspector window 30. If the test result in step 611 (FIG. 10A) is YES, indicating that the pointer is over the name of an action in the right-hand column of the inspector window, control passes to step 612 in which the action under pointer 20 (FIG. 5) is highlighted and any previously highlighted action is unhighlighted.

If the test result in step 611 (FIG. 10A) is NO, indicating that pointer 20 is not over the name of an action in right-hand column 401 (FIG. 5) of inspector window 30, control passes to conditional branch point 645 (FIG. 10A) which tests to determine if pointer 20 (FIG. 5) is over the name of a connection type name in connection type subwindow 420 (FIG. 5). If the test result in step 645 (FIG. 10A) is YES, indicating that pointer 20 (FIG. 5) is over a connection type name 510 (FIG. 5), control passes to step 643 (FIG. 10A) in which the system highlights the connection type in subwindow 420 (FIG. 5) and unhighlights any other connection type that may already be highlighted.

If the test result in step 645 (FIG. 10A) is NO, indicating that pointer 20 (FIG. 5) is not over the name of a connection type in subwindow 420, control passes to conditional branch point 670 (FIG. 10A) which tests to determine if pointer 20 (FIG. 5) is over the inspector mode button 427. If the test result in step 670 (FIG. 10A) is YES, indicating that pointer 20 (FIG. 5) is over the inspector mode button 427, control passes to step 700 (FIG. 10B) where the mode change is made.

If the test result at test 670 (FIG. 10A) is NO, control passes to conditional branch point 646, which tests to determine if the pointer is over the name of an outlet in the left column subwindow 400 (FIG. 5). If the test result in step 646 (FIG. 10A) is YES, indicating that pointer 20 (FIG. 5) is over the name of an outlet, control passes to step 644 (FIG. 10A) which highlights the outlet, unhighlights any other highlighted outlet. Next, in step 642, valid connection types for this outlet and the highlighted destination are listed.

After listing valid outlets in step 642 or after highlighting the connection type in step 643, control passes to step 641, in which any valid destination actions for the highlighted outlet and connection type are listed in subwindow 420 (FIG. 5). After listing valid destination actions in step 641 (FIG. 10A) or after highlighting the action under pointer 20 (FIG. 5), in step 612 (FIG. 10A), control passes to step 640, which sets the label on the button 423 (FIG. 5) to "CONNECT" and unhighlights any connection in subwindow 419 that may be highlighted. After step 640 (FIG. 10A) control passes back to step 607 to wait until the mouse button is clicked again.

If the test result in step 670 (FIG. 10A) is YES, indicating that the mouse button was clicked while pointer 20 (FIG. 5) is positioned over the inspector mode button 427 (FIG. 5), control passes to step 700 (FIG. 10B), where the inspector mode is switched to the "attributes" mode, as shown in FIG. 16.

After the inspector mode is switched to the "attributes" mode from the "connections" mode in step 700 (FIG. 10B), control passes to step 701 (FIG. 10B) in which the attribute inspector mode is displayed for the highlighted object, replacing the connections mode inspector 30 (FIG. 5). Next, conditional branch point 702 (FIG. 10B) tests to determine if the highlighted object has acquired outlets. If the test result in step 702 (FIG. 10B) is YES, indicating the object has acquired outlets, those outlets are listed in the outlet window of the inspector window 920 (FIG. 16) in step 703.

After step 703, or if the test result in 702 is NO, conditional branch 704 tests to determine if the mouse button has been clicked while printer 20 is positioned over the attribute inspector. If the test result in step 704 is NO, the mouse button has not yet been clicked, and control remains at step 704 and the listed outlets continue to be displayed until the mouse button is clicked. If the test result in step 704 is YES, indicating that the mouse button has been clicked while pointer 20 is over inspector mode button 927 (FIG. 16), control passes to conditional branch point 602 (FIG. 9) in which the mode of the inspector is switched back to the connections mode. If the test result in step 704 (FIG. 10B) is NO, indicating that pointer 20 is not over the inspector mode button when the mouse button is clicked, control passes to step 706 which tests to determine if pointer 20 is over a blank space in the list of acquired outlets 921 (FIG. 16). If the test result in step 706 (FIG. 10B) is YES, indicating that the mouse button was clicked while pointer 20 was positioned over a blank space in the list, control passes to step 707, in which the blank space is highlighted. If the test result in step 706 is NO, control passes to conditional branch point 711, which tests to determine to see if the cursor is over a listed outlet name 920 (FIG. 16) in list of acquired outlets 921 on the inspector window shown in FIG. 16. If the test result in step 711 (FIG. 10B) is NO, indicating that pointer 20 is not over a listed outlet name, control returns to step 701 to wait for the mouse button to be clicked again. If the test result in step 711 is YES, indicating that pointer 20 is over a listed outlet name, control passes to step 712, in which the selected outlet name is highlighted and the highlighted outlet is detected in step 713. After step 713 or step 707, user provided input, e.g., from a keyboard, is received in step 708 to define a new outlet name. The syntax of the outlet name entered is tested for validity, e.g., to see if it is a valid name (e.g., not all blank) in conditional branch point 709. If the test result in step 709 is NO, the name is not valid, and control returns to step 704 to wait for the mouse button to be clicked again. If the test result in step 709 is YES, then the outlet name provided by the keyboard input at step 708 was valid, and a message is sent to the highlighted object to acquire the outlet named in step 710. After the outlet is thus acquired by the highlighted object at step 710, control returns to step 701 to wait for the mouse button to be clicked again.

If the test result in step 646 (FIG. 10A) is NO, indicating that pointer 20 (FIG. 5) is not over the name of an outlet, control passes to conditional branch point 647 (FIG. 11), which tests to determine if pointer 20 (FIG. 5) is over a connection in connection display subwindow 419. If the test result in step 647 (FIG. 11) is YES, indicating that pointer 20 (FIG. 5) is over a connection in connection display subwindow 419, control passes to step 650 (FIG. 11) in which the system hides any connecting lines and redraws the line of the selected connection, highlighting only the source and destination graphical representations of the connected subprograms. Next in step 651, the system highlights the outlet of the highlighted connection in the subwindow 400 (FIG. 5), and unhighlights any other highlighted outlets.

In step 652 (FIG. 11), any allowable connection types for the selected outlet are listed in subwindow 420 (FIG. 5) and in step 653 (FIG. 11), the type of connection of the selected connection is highlighted, while all other connection types are unhighlighted. Next, in step 654, the actions allowed by the type of connection from the selected outlet to the selected destination are displayed, in subwindow 401 (FIG. 5). Thereafter, in step 655 (FIG. 11), the selected action of the highlighted connection is highlighted, while any other previously highlighted actions in the display are unhighlighted. Next, in step 656, the label on CONNECT button 423 (FIG. 5) is set to "DISCONNECT". Control then returns to step 607 (FIG. 10A) to wait for another button click.

If the test result in step 647 is NO, indicating that pointer 20 is not over a connection in the connection display, control passes to conditional branch point 616, which tests to determine if pointer 20 was over CONNECT button 423 (FIG. 5). If the test result in step 616 is NO, indicating that pointer 20 is not over CONNECT button 423 (FIG. 5), control passes back to step 607 (FIG. 10A) to wait for a button click. If the test result in step 616 is YES, control passes to step 617, which invokes the connection Deleting/Making Process shown in FIGS. 12 and 13, respectively.

Figure 11:
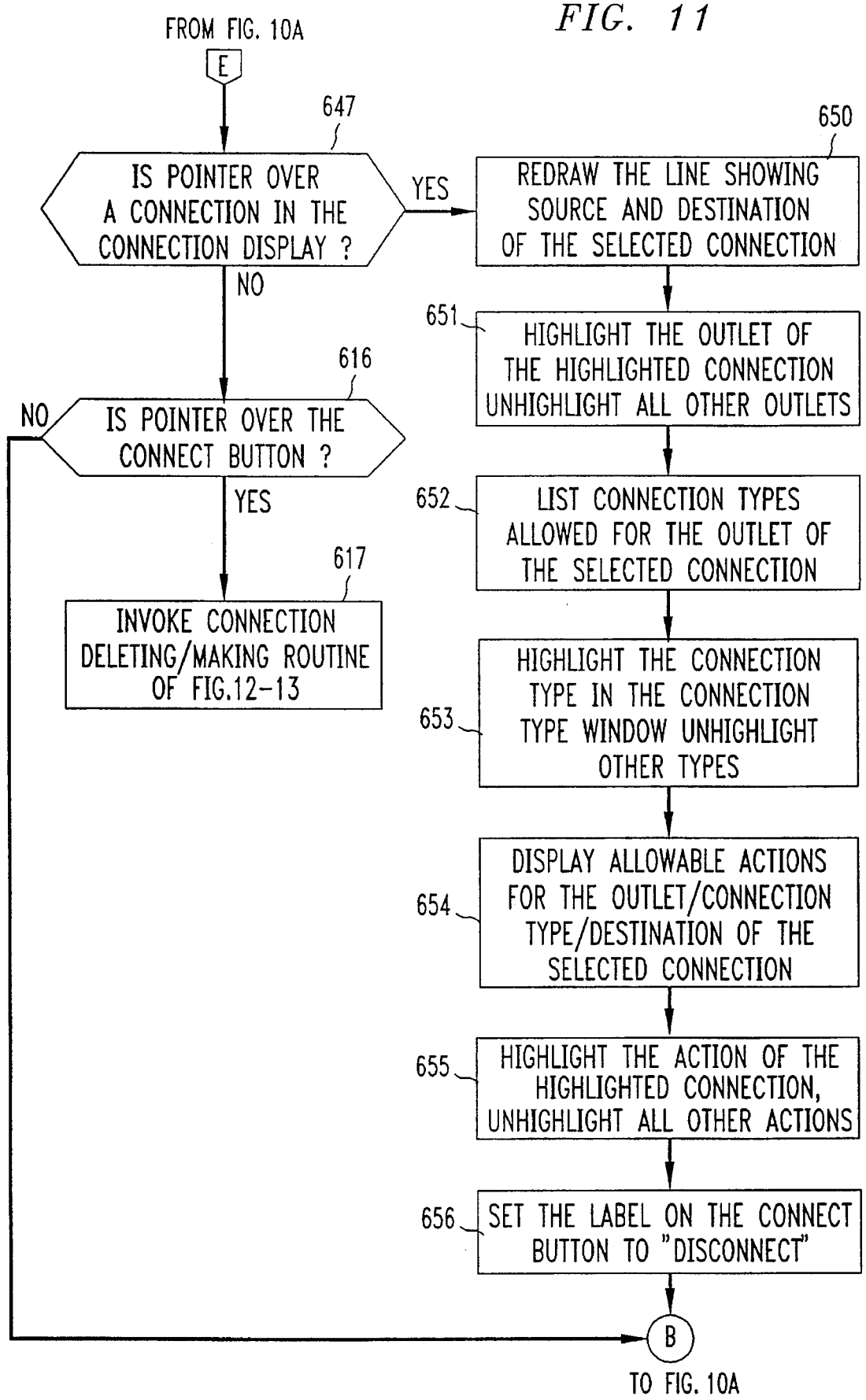
Figure 12:
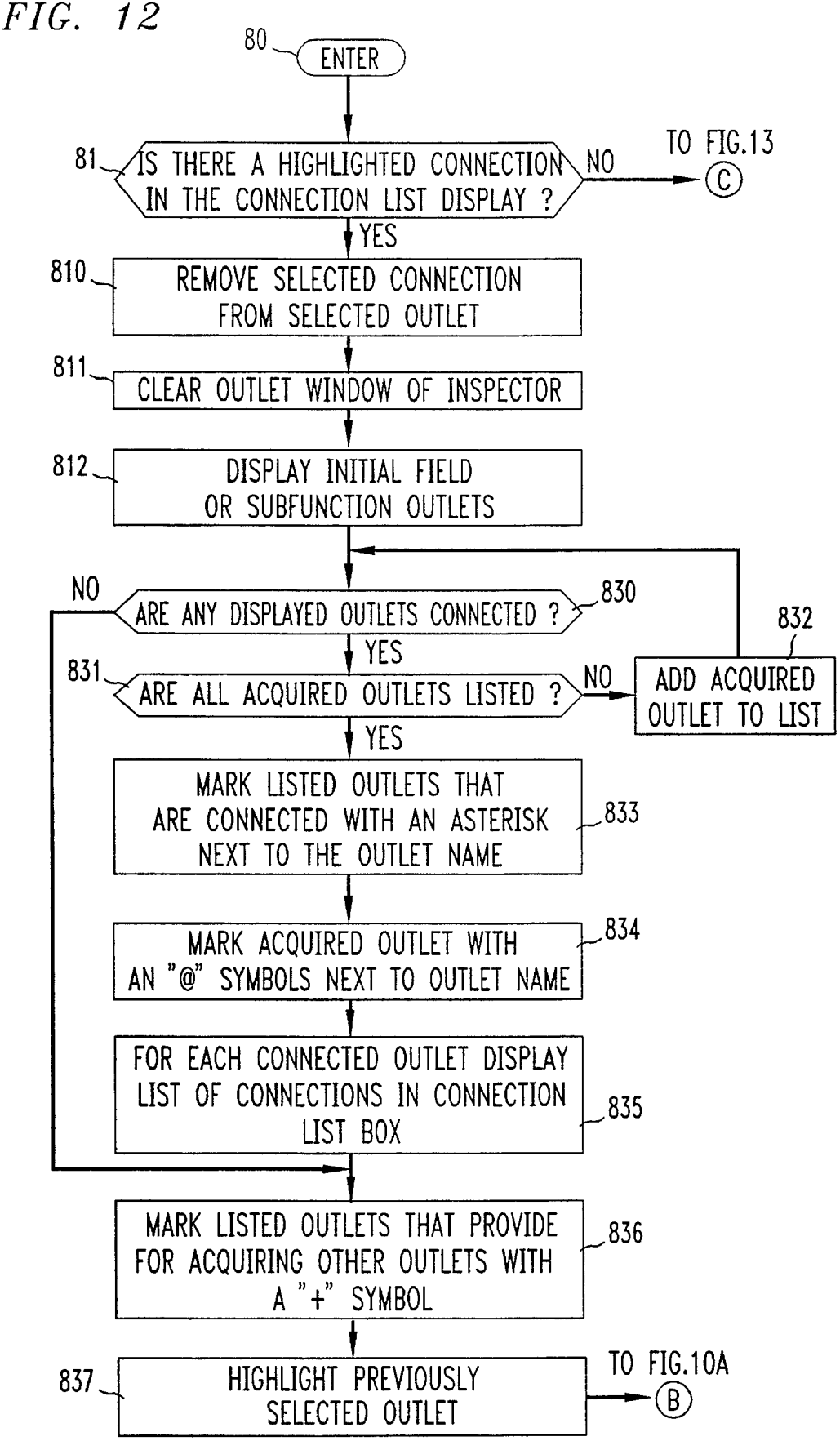
Figure 13:
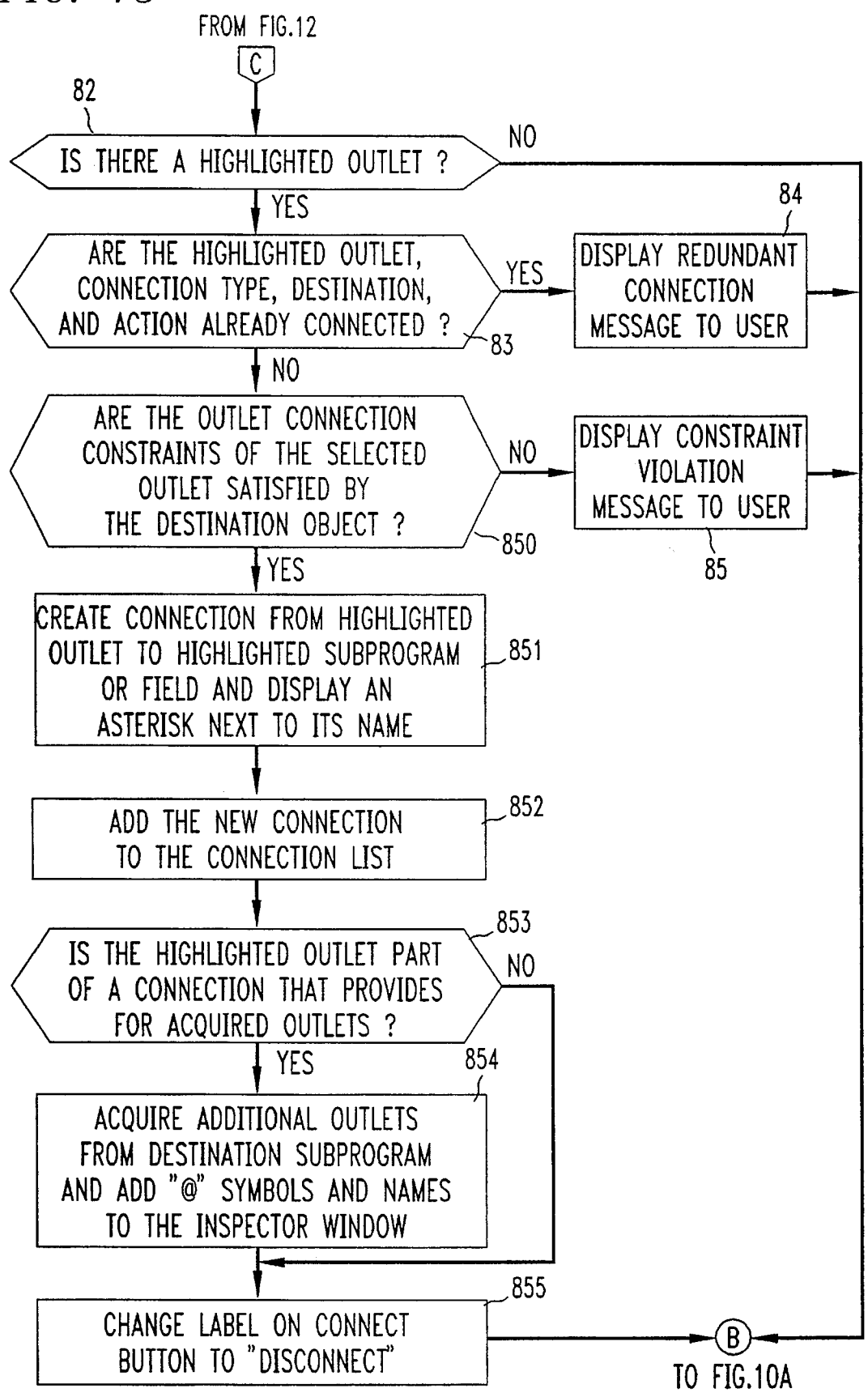

FIGS. 12 and 13 together form a flow diagram of the connection Deleting/Making Process, which is invoked at step 617 in FIG. 11. The process is entered at step 80 (FIG. 12) when the mouse button is clicked while pointer 20 is over "CONNECT" button 423 (FIG. 5) of inspector window 30. Next, conditional branch point 81 (FIG. 12) tests to determine if there is a selected connection in the connection display list 419 (FIG. 5).

If the test result in step 81 (FIG. 12) is NO, indicating that there is no selected connection highlighted, control passes to conditional branch point 82, shown in FIG. 13 which test to determine if there is a highlighted outlet to be connected. If the test result in step 82 is NO, indicating there is no highlighted outlet to be connected, the system returns to step 607 (FIG. 10A) to wait for another button click. If the test result in step 82 is YES, indicating that there is an outlet highlighted, control passes to conditional branch point 83, which tests to determine if the combination of the a) highlighted outlet, b) highlighted connection type, c) highlighted destination, and d) highlighted action are already defined for some existing connection. If the test result in step 83 is YES, indicating that there exists such a connection already, control passes to step 84, in which the user is alerted with a message indicating that a redundant connection was requested. Control then returns to step 607 (FIG. 10A) to wait for the mouse button to be clicked again.

If the test result in step 83 (FIG. 13) is NO, indicating that there is no redundant connection, control passes to conditional branch point 850, which tests to determine if the parameters associated with the highlighted outlet allow for a connection to the highlighted destination. In this embodiment, parameters associated with each outlet prevent the program configuration system at conditional branch point 850 from creating connections to inappropriate destinations, and in particular to destination objects that do not have needed operations. If the test result in step 850 is NO, indicating that the outlet parameters preclude a connection of the type selected to the destination selected, control passes to step 85, in which a constraint violation message is displayed to the user indicating the implied conflict between the outlet parameters, connection type, and the destination object operation. Control then passes back to step 607 (FIG. 10A) to wait for another button click.

However, if the test result in step 850 (FIG. 13) is YES, indicating that the parameters of the highlighted outlet and the highlighted connection type allow for a connection to the highlighted destination object, control passes to step 851, in which a new connection of the type selected from the highlighted outlet to the highlighted destination associated with the highlighted action is created. Also, an asterisk 404 (FIG. 5) is displayed next to the outlet name in subwindow 400. Next, in step 852 (FIG. 13), the details of the new connection are added to the connection display in subwindow 419 (FIG. 5).

Thereafter, conditional branch point 853 (FIG. 13) tests to determine if the highlighted new connection provides for acquired outlets. If the test result in step 853 (FIG. 13) is YES, indicating that the new connection provides for acquiring new outlets from the destination subprogram or field, control passes to step 854, where the system causes the selected source object to acquire additional outlets, and list them in the inspector window along with an "@" symbol next to each such outlet listed, indicating each such outlet is an acquired outlet.

If the test result in step 853 is NO, indicating the system finds that the new connection does not provide any acquired outlets, or after execution of step 854, control passes to step 855, in which the label on button 423 (FIG. 4) is changed to "DISCONNECT" 423, as shown in FIG. 5. Control then passes back to step 607 (FIG. 10A) to wait for a button click.

If the test result in step 81 (FIG. 12) is YES, indicating that there is a highlighted connection in the connection display list 419 (FIG. 5), control passes to step 810 (FIG. 12) in which the process of disconnecting the selected connection and updating the display is begun. The process continues in step 810, in which the selected connection is removed from the connection list for the selected outlet. Next, in step 811, subwindow 400 (FIG. 5) is cleared within inspector window 30 (FIG. 5). Next, in step 812 (FIG. 12), a list of the outlets provided by the selected source object is redisplayed in subwindow 400 (FIG. 5).

Conditional branch point 830 (FIG. 12) tests to determine if any outlets displayed in step 812 are already connected. If them are such already connected outlets, the test result in step 830 is YES and control passes to conditional branch point 831, which tests to determine if all of the possible acquired outlets are listed in inspector subwindow 400 (FIG. 5). All acquired outlets not previously listed are added to the list in step 832. Control then passes back to step 831 to test if all possible acquired outlets are listed.

After possibly several cycles between test 831 and step 832, by which all outlets and acquired outlets are identified and listed, control passes to step 833, in which any listed outlets are marked with an asterisk 404 (FIG. 5) if they are used in one or more connections to one or more destination subprograms or fields. In step 834 (FIG. 9), all acquired outlets are marked with an "@" symbol 500 (FIG. 5) next to the outlet name, and in step 835 (FIG. 9) a list of all connections from the selected source subprogram or field is displayed in subwindow 400 (FIG. 5). Next, in step 836 (FIG. 12), outlets that provide for acquiring additional outlets from a destination subprogram are marked with a "+" symbol 406 (FIG. 5) next to the name of the outlet, whether or not such outlets are connected. Thereafter, a list of connection types supported by the highlighted outlet in subwindow 400 (FIG. 5) is displayed in subwindow 420 (FIG. 5), in step 837 (FIG. 12). Control then passes back to step 607 (FIG. 10A) to wait for another button click.

In accordance with the principles of the invention, the system stimulates the "source" object program logic to acquire outlets by sending a message to the object in program memory represented by the selected graphic element such that the object is queried it for its list of outlets. When an appropriately-designed source object is thus queried, it in turn queries the connected (and highlighted) destination object for property names that may be used to name new outlet variable names or objects. The source object then creates new outlets for its own program logic to use, using names provided by the destination object that respond to the query. The new outlets thus created by the source object functionality are called "acquired" outlets and listed next to the "@" symbol in the inspector display. In the preferred implementation, the particular destination objects that are queried for names are those that are part of an existing connection of the type that provides for generating outlet names (e.g., connections whose outlets are marked "+" in the inspector window).

In the example program, when the inspector window is first displayed, the source object "CONNECTIONS-1" is queried by the system for it's list of outlets for the purpose of listing them in inspector window 30. When the object in memory associated with "CONNECTIONS-1" is so queried, a connection established to FUNCTION-1, together with the functionality of each subprogram, stimulates CONNECTIONS-1 to query FUNCTION-1 for a list of names that may be used as outlet variable names or objects to be acquired by CONNECTIONS-1.

In the preferred mode of operation, objects that contain the functionality necessary to acquire outlet variable names or outlet objects by querying connected destination objects may also be manipulated by the system to allow the system user to directly type in the desired outlet variable names using the system keyboard. The system provides for the user to manually use the keyboard to add, delete, and change the name of acquired outlets by switching to the attributes inspector from the connections inspector 30. To switch to the attributes inspector, the user positions the mouse over the inspector mode button and clicks the mouse button. The user may return to the connections inspector by the same process.

Figure 15:
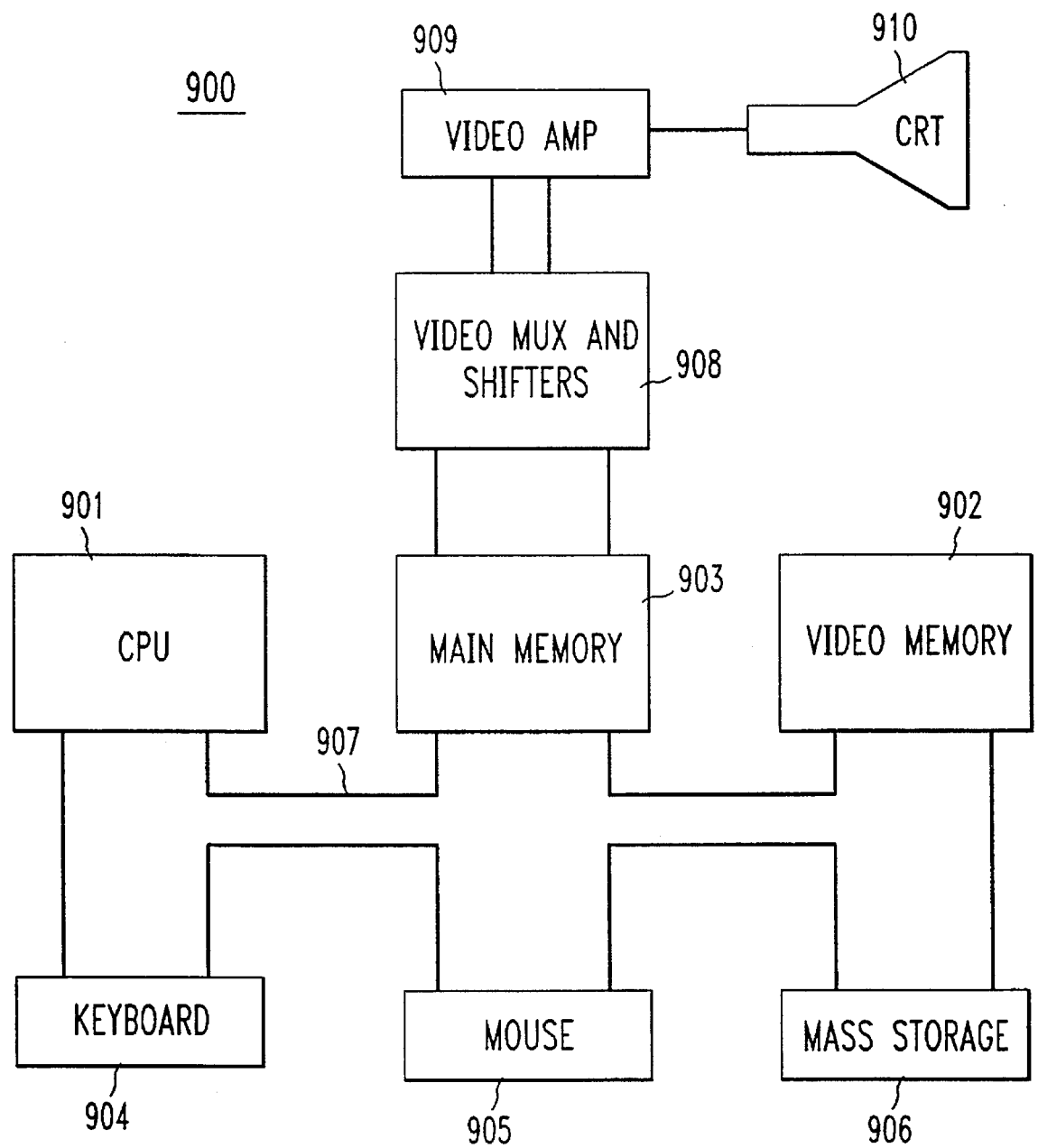
FIG. 15 is a block diagram of an exemplary hardware configuration for a computer on which the system and method of the present invention are implemented.

While the present invention may advantageously be implemented on nearly any conventional computer system, exemplary computer system 900 on which the present invention is implemented is shown in FIG. 15. System 900 includes a) CPU 901; b) main memory 902; c) video memory 903; d) keyboard 904 for user input; e) mouse 905 for manipulating graphic images according to the present invention; and f) mass storage 906, which may include both fixed and removable media using any one or more of magnetic, optical or magnetoptical storage technology or any other available mass storage technology. These components are interconnected via conventional bi-directional system bus 907. Bus 907 contains 32 address lines for addressing any portion of memory 902 and 903. System bus 907 also includes a 32 bit data bus for transferring data between and among a) CPU 901, b) main memory 902, c) video memory 903, and d) mass storage 906. In the embodiment shown, CPU 901 is a Motorola 68030 32-bit microprocessor, but any other suitable microprocessor or microcomputer may alternatively be used. Detailed information about the 68030 microprocessor, in particular concerning its instruction set, bus structure, and control lines, is available from MC68030 User's Manual, published by Motorola Inc., of Phoenix, Ariz.

Main memory 902 of system 900 comprises eight megabytes of conventional dynamic random access memory, although more or less memory may suitably be used. Video memory 903 comprises 256K bytes of conventional dualported video random access memory. Again, depending on the resolution desired, more or less such memory may be used connected to a port of video memory 903 is video multiplex (MUX) and shifter circuitry 908, to which, in turn, is connected video amplifier 909. Video amplifier 909 drives cathode-ray tube (CRT) raster monitor 910. Video multiplex and shifter circuitry 908 and video amplifier 909, which are conventional, convert pixel data stored in video memory 903 to raster signals suitable for use by monitor 910. Monitor 910 is of a type suitable for displaying graphic images having a resolution of 1120 pixels wide by 832 pixels high.

The foregoing merely illustrates the principles of the invention. It will thus be appreciated that those skilled in the art will be able to devise various arrangements which, although not explicitly described or shown herein, embody the principles of the invention and are thus within its spirit and scope.

We claim:

1. Apparatus for use by a user in configuring a program having at least two already compiled and executing subprograms, comprising:

means for receiving from said user an indication that said user desires to create in a first of said subprograms new additional outlets that facilitate connection of said first subprogram to other subprograms of said at least two subprograms;

means responsive to said user indication for sending messages to said first of said subprograms to stimulate said first subprogram to create said desired new additional outlets; and means, responsive to receipt of a message from said first subprogram indicating successful creation of said desired additional new outlets in said first subprogram, for reporting to said user that said new additional outlets have become available for connection.

2. The invention as defined in claim 1 further including means responsive to said indication for establishing connections between said new additional outlets of said first subprogram and one of said at least two subprograms.

3. The invention as defined in claim 1 wherein said messages for stimulating said first subprogram causes said first subprogram to create said new additional outlets by using a list of outlet names derived from information obtained from a second subprogram.

4. The invention as defined in claim 3 wherein the information obtained by said first subprogram from said second subprogram includes a list of object names from which said first subprogram creates said new additional outlets.

5. The invention as defined in claim 1 wherein said first subprogram creates said new additional outlets by assembling a list of outlet names using information provided by a person.

6. The invention as defined in claim 5 wherein said person provides said information by typing on a keyboard.

7. The invention as defined in claim 3 wherein connections from at least one of said new additional outlets of said first subprogram and another subprogram are constrained to conform to at least one specific connection type.

8. The invention as defined in claim 7 wherein said specific connection type includes a limitation on the number of connections of said specific connection type from said at least one of said new additional outlets of said first subprogram.

9. The invention as defined in claim 7 wherein said specific connection type includes a requirement that said other subprogram have specific predetermined characteristics.

10. A method used in a computer program configuration system having a graphical display for displaying at least first and second post compilation and already executing objects, the method comprising the steps of:

receiving, by said computer configuration system, an indication that a user has made a connection from said first object to said second object;

in response to said received indication, stimulating said first object to create at least one additional outlet based on information supplied from said second object via said connection;

displaying on said graphical display said at least one additional outlet created by said first object from said information; and connecting, in response to receiving an input from said user to connect said created additional outlet to another object input from said user, said at least one additional created outlet of said first object to said other object.

11. A computer program configuration system having a graphical display for displaying at least first and second compiled and executing objects, said second object having at least one outlet, the computer program configuration system being characterized by:

means for displaying on said graphical display newly created additional outlets of said first object outlet based on information acquired by said first object from said second object through the exchange of messages between said first and second objects, said newly created additional acquired outlets including said at least one outlet of said second object; and means for further connecting the displayed newly created additional acquired outlets of said first object to at least one object.

12. The invention as defined in claim 11 wherein said at least one object is said second object.

13. The invention as defined in claim 11 wherein said at least one object is a third object.

\* \* \* \* \*